US009610825B2

(12) United States Patent
Zhong et al.

(10) Patent No.: US 9,610,825 B2
(45) Date of Patent: *Apr. 4, 2017

(54) MOTOR VEHICLE CLIMATE CONTROL SYSTEM

(71) Applicant: Ford Global Technologies, LLC, Dearborn, MI (US)

(72) Inventors: Yongfang Zhong, Evanston, IL (US); Michael Levin, Ann Arbor, MI (US); Furqan Zafar Shaikh, Troy, MI (US); Danrich Henry Demitroff, Okemos, MI (US); Donald Masch, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/679,689

(22) Filed: Apr. 6, 2015

(65) Prior Publication Data

US 2015/0210142 A1    Jul. 30, 2015

Related U.S. Application Data

(63) Continuation of application No. 13/749,573, filed on Jan. 24, 2013, now Pat. No. 8,997,505.

(Continued)

(51) Int. Cl.
*B60H 1/32* (2006.01)
*B60H 1/00* (2006.01)
(Continued)

(52) U.S. Cl.
CPC ........ *B60H 1/3201* (2013.01); *B60H 1/00899* (2013.01); *B60H 1/025* (2013.01); *B60H 1/14* (2013.01); *F01N 5/02* (2013.01)

(58) Field of Classification Search
CPC ........ B60H 1/3201; B60H 1/025; B60H 1/14; B60H 1/00899; F01N 5/02
(Continued)

(56) References Cited

U.S. PATENT DOCUMENTS

| 4,531,951 A | 7/1985 | Burt et al. |
| 4,742,868 A | 5/1988 | Mitani et al. |

(Continued)

FOREIGN PATENT DOCUMENTS

CN    1035260 A    9/1989

OTHER PUBLICATIONS

Partial Translation of Office Action of Chinese Application No. 2013103561183, Issued Oct. 23, 2015, State Intellectual Property Office of PRC, 8 Pages.

*Primary Examiner* — Mohammad M Ali
(74) *Attorney, Agent, or Firm* — Julia Voutyras; McCoy Russell LLP

(57) ABSTRACT

A vehicle climate control system includes a thermal-adsorption heat pump driven by engine exhaust heat, the heat pump including two adsorbers asynchronously switching between adsorbing and desorbing modes, each adsorber coupled with a corresponding antifreeze tank via a plurality of refrigerant-containing wick chambers. Cold heat transfer fluid (HTF) flows through the adsorber during the adsorbing mode which causes evaporation of refrigerant from the wick chambers, thereby cooling antifreeze, whereas hot HTF flows through the adsorber during the desorbing mode which causes condensation of refrigerant at the wick chambers, thereby heating antifreeze. In this way, the thermal-adsorption heat pump may condition cabin air independent of engine coolant and without exerting a load on the engine.

20 Claims, 10 Drawing Sheets

ADSORBING MODE

Related U.S. Application Data

(60) Provisional application No. 61/684,080, filed on Aug. 16, 2012.

(51) Int. Cl.
  *B60H 1/02* (2006.01)
  *B60H 1/14* (2006.01)
  *F01N 5/02* (2006.01)

(58) Field of Classification Search
  USPC .................... 62/79, 320, 106, 238.3, 244
  See application file for complete search history.

(56) References Cited

U.S. PATENT DOCUMENTS

| | | | |
|---|---|---|---|
| 4,793,143 A | 12/1988 | Rhodes | |
| 4,842,709 A | 6/1989 | Mayeaux | |
| 4,991,395 A | 2/1991 | Markou et al. | |
| 5,231,849 A | 8/1993 | Rosenblatt | |
| 5,359,864 A * | 11/1994 | Yamada | B60H 1/3201 62/430 |
| 5,404,728 A | 4/1995 | Maier-Laxhuber | |
| 5,469,913 A | 11/1995 | Gamou et al. | |
| 5,765,369 A | 6/1998 | Tanaka et al. | |
| 5,813,248 A | 9/1998 | Zornes et al. | |
| 6,155,073 A | 12/2000 | Gray | |
| 6,170,279 B1 | 1/2001 | Li | |
| 6,282,919 B1 | 9/2001 | Rockenfeller et al. | |
| 6,415,627 B1 * | 7/2002 | Pfister | F25B 17/08 165/104.26 |
| 6,474,099 B2 * | 11/2002 | Tanaka | F25B 17/083 62/476 |
| 6,615,603 B2 * | 9/2003 | Tanaka | F25B 27/02 165/104.33 |
| 6,994,154 B2 * | 2/2006 | Nagashima | F25B 35/04 165/104.21 |
| 7,581,698 B2 | 9/2009 | Hoehne et al. | |
| 8,333,079 B2 * | 12/2012 | Kakiuchi | B01J 20/0292 502/69 |
| 2002/0035849 A1 * | 3/2002 | Tanaka | F25B 17/083 62/480 |
| 2003/0005721 A1 * | 1/2003 | Sato | B60H 1/3201 62/480 |
| 2003/0167925 A1 * | 9/2003 | Aikawa | B60H 1/00492 96/126 |
| 2003/0180586 A1 | 9/2003 | Hagans et al. | |
| 2004/0007011 A1 | 1/2004 | Tanaka | |
| 2004/0089001 A1 * | 5/2004 | Kakiuchi | B01J 20/0292 62/112 |
| 2004/0149129 A1 | 8/2004 | Petersson et al. | |
| 2004/0200603 A1 * | 10/2004 | Nagashima | F25B 35/04 165/133 |
| 2005/0011209 A1 | 1/2005 | Sawada et al. | |
| 2005/0252235 A1 * | 11/2005 | Critoph | F25B 17/00 62/480 |
| 2005/0274493 A1 | 12/2005 | Golben | |
| 2006/0112706 A1 * | 6/2006 | Inoue | B60H 1/3201 62/238.3 |
| 2007/0252253 A1 | 11/2007 | Chrysler et al. | |
| 2007/0267328 A1 | 11/2007 | Neumann et al. | |
| 2009/0244830 A1 | 10/2009 | Wyatt et al. | |
| 2011/0005267 A1 | 1/2011 | Lambert et al. | |
| 2013/0192281 A1 | 8/2013 | Nam et al. | |

\* cited by examiner

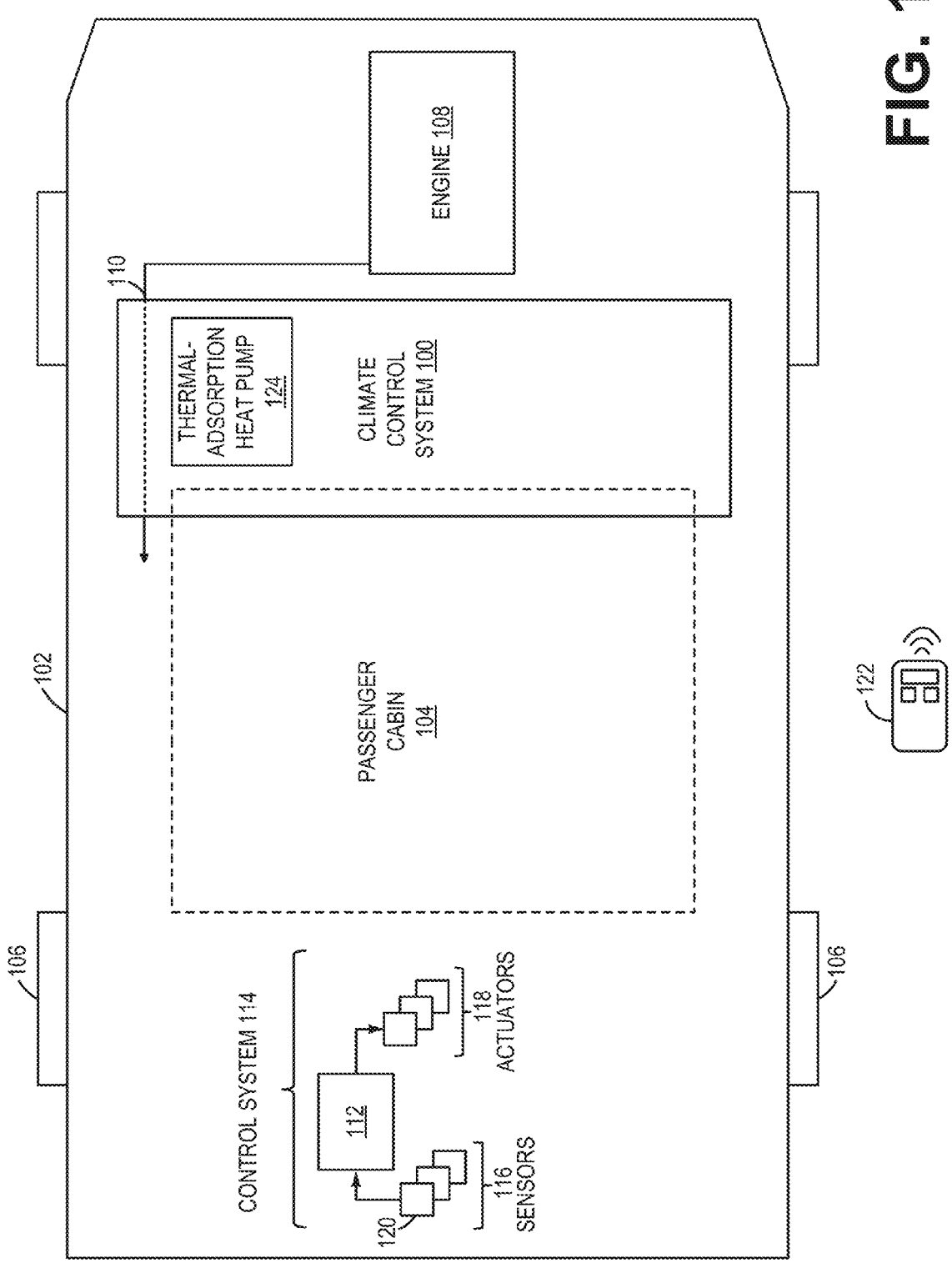

ADSORBING MODE

DESORBING MODE

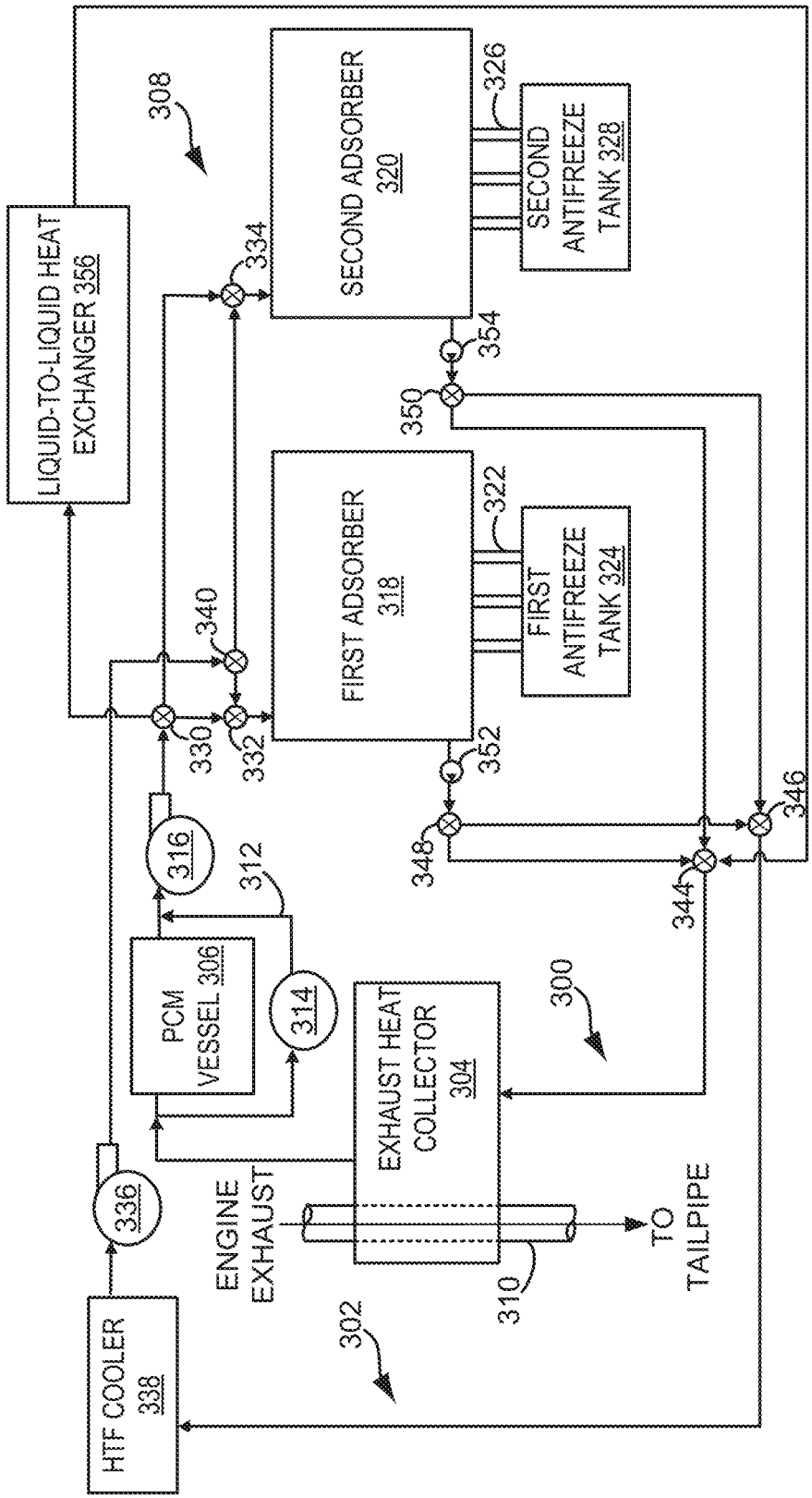

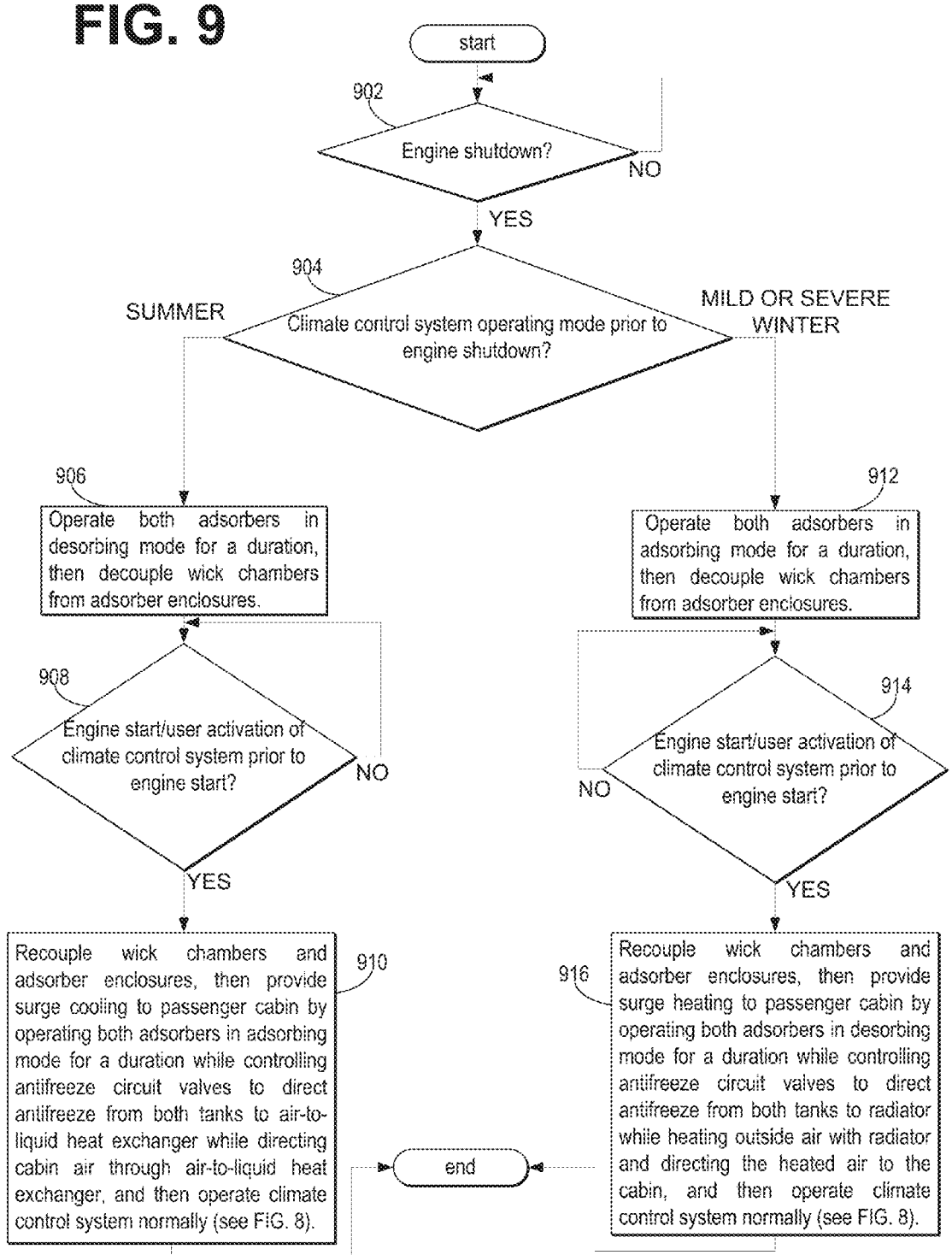

MOTOR VEHICLE CLIMATE CONTROL SYSTEM

CROSS REFERENCE TO RELATED APPLICATIONS

The present application is a continuation of U.S. patent application Ser. No. 13/749,573, entitled "MOTOR VEHICLE CLIMATE CONTROL SYSTEM," filed on Jan. 24, 2013, which claims priority to U.S. Provisional Patent Application Ser. No. 61/684,080, entitled "MOTOR VEHICLE CLIMATE CONTROL SYSTEM," filed on Aug. 16, 2012, the entire contents of each of which are hereby incorporated by reference for all purposes.

FIELD

The present description relates generally to methods and systems for motor vehicle climate control including a thermal-adsorption heat pump with two adsorbers.

BACKGROUND/SUMMARY

In some motor vehicle climate control systems, a thermal-adsorption heat pump may be used instead of a compressor-driven heat pump. Thermal-adsorption heat pumps use an adsorbent chemical (e.g., zeolite, silica gel, activated carbons) rather than a mechanical compressor, and are driven by thermal energy (such as waste exhaust heat) rather than mechanical work.

One cycle of operation of a thermal-adsorption heat pump includes the adsorption of a refrigerant, e.g. water, onto a solid adsorbent, e.g., zeolite (during what is referred to herein as "adsorbing mode"), and the subsequent desorption of the refrigerant from the adsorbent (during what is referred to herein as "desorbing mode"). This process may occur in a canister referred to as an adsorber. During the adsorbing mode, the adsorbent is actively cooled, for example via a cool heat transfer fluid (HTF). The cooling of the adsorbent creates suction, which draws vaporized refrigerant into the adsorber and for adsorption by the adsorbent.

US 2011/0005267 describes an automobile air-conditioning system including a thermal-adsorption heat pump which operates in conjunction with a condenser and evaporator in the manner described above. The thermal-adsorption heat pump is powered by engine exhaust heat, and includes at least two adsorbers which adsorb and desorb refrigerant cyclically and asynchronously. In one embodiment, the system includes three working fluid loops: an HTF loop for heating/cooling the adsorbers where the working fluid is a mineral-oil-based HTF, an adsorption loop entirely exterior to the passenger cabin where the working fluid may be $NH_3$, and a refrigerant loop transferring heat from the cabin to the adsorption loop (via an inter-loop heat exchanger) where the working fluid may be R-134a.

The HTF loop heats/cools the adsorbers to effect adsorption/desorption at the adsorbents within the adsorbers. Cool HTF for the adsorbing mode is provided by an HTF cooler, and hot HTF for the desorbing mode is provided by an HTF heater. Thermal reservoirs storing exhaust heat in phase change material (PCM) are coupled with the HTF heater. The adsorption loop includes $NH_3$ which is adsorbed/desorbed from the adsorbents. After the engine is shut off, heat stored in the thermal reservoirs is used to desorb $NH_3$ from the adsorbents into a reservoir. $NH_3$ stored in the reservoir is then used to provide "surge cooling" after engine cold start, while HTF in the HTF loop is still being heated, in order to start thermally cycling the adsorbers and pumping refrigerant. To provide cooling to the cabin, a heat exchanger is coupled with the refrigerant loop and the adsorbent loop. At the heat exchanger, R-134a from the refrigerant loop condenses, while $NH_3$ from the adsorbent loop evaporates. The refrigerant loop further includes an R-134a evaporator communicating with the cabin to provide cooling to the cabin via a blower.

In contrast with the above-described system, the inventors herein have identified a climate control system incorporating a thermal-adsorption heat pump which provides cabin heating in addition to cabin cooling, despite requiring fewer engine-driven or electrically-driven components. That is, the inventors herein have recognized that in a two-adsorber system, wick chambers (such as those used in heat pipes) thermally coupling each adsorber with a respective antifreeze tank may be used in place of a dedicated evaporator and condenser. In one example, a method for a vehicle cabin climate control system includes, during engine operation, asynchronously switching first and second adsorbers of a thermal-adsorption heat pump between adsorbing and desorbing modes, the adsorbing adsorber cooling antifreeze via wick chambers and the desorbing adsorber heating antifreeze via wick chambers, and conditioning cabin air via the heated antifreeze or the cooled antifreeze depending on an operating mode of the climate control system.

In this way, when an adsorber is in the adsorbing mode, the suction of a refrigerant (e.g., water, $NH_3$, R1234f) stored in the wick chambers engenders a cooling effect in the antifreeze tank in which a portion of the wick chambers are disposed. This cooling effect can be harnessed to cool the passenger cabin during hot weather conditions (for example during a "summer mode"). Similarly, when an adsorber is in the desorbing mode, the condensation of refrigerant desorbed from the desiccant in the wick chambers engenders a heating effect in the antifreeze tank, which may be harnessed to heat the passenger cabin during cold weather conditions (for example during a "mild winter mode" or "severe winter mode" depending on the severity of the cold weather).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 schematically shows a motor vehicle incorporating the climate control system described herein.

FIG. 3 schematically shows hot and cold HTF circuits and associated components which may be included in the climate control system of FIG. 1.

FIG. 9 depicts an example method for operating the climate control system of FIG. 1 after engine shutdown and at or prior to a subsequent engine start to provide surge cooling or surge heating to the passenger cabin.

DETAILED DESCRIPTION

Figure 2A:
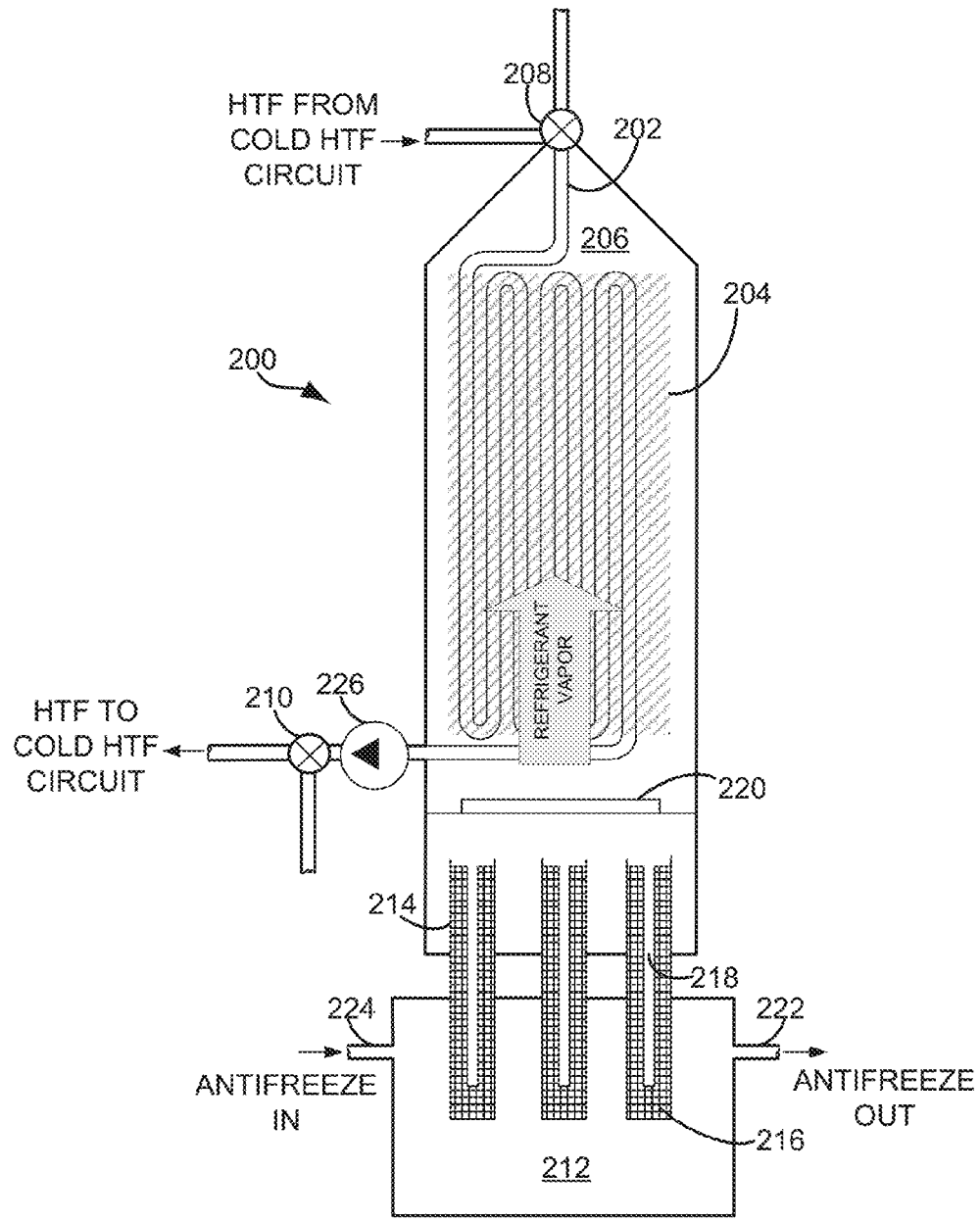
FIG. 2A shows a cross-sectional view of an example adsorber in an adsorbing mode, along with associated wick chambers and antifreeze tank. Two such adsorbers may be included in the climate control system of FIG. 1.
Figure 2B:
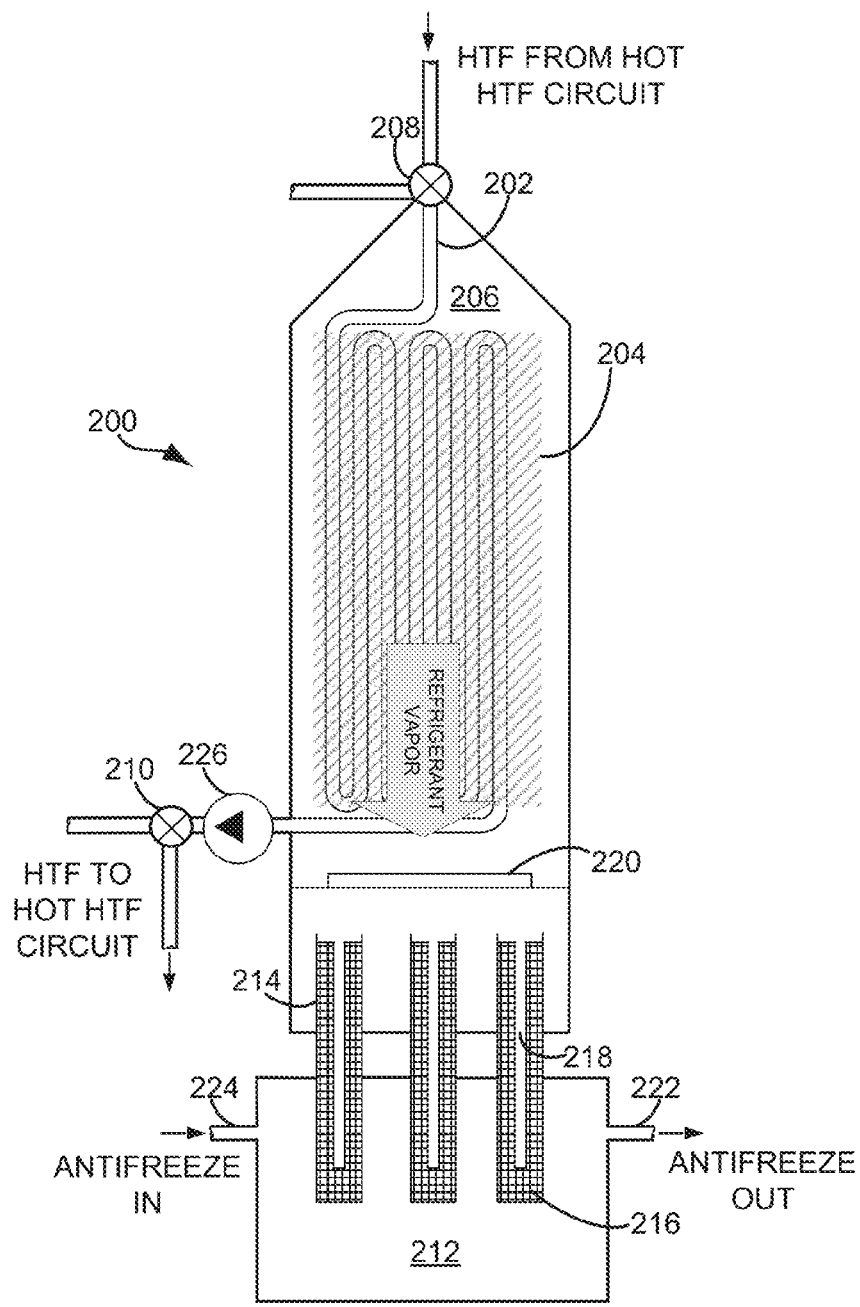
FIG. 2B shows a cross-sectional view of the example adsorber of FIG. 2A in a desorbing mode, along with associated wick chambers and antifreeze tank.

The following description relates to systems and methods for cooling and heating a passenger cabin of a motor vehicle via a climate control system incorporating a thermal-adsorption heat pump. As shown in FIG. 1, the climate control system may be thermally coupled with an engine exhaust conduit, but may not otherwise communicate with or load the vehicle's engine. The thermal-adsorption heat pump may include two adsorbers, each adsorber coupled to a respective antifreeze tank via a plurality of wick chambers as shown in FIGS. 2A-2B.

Each adsorber may include a closed refrigerant circuit wherein refrigerant travels between the wick chambers and an adsorbent within an enclosure of the adsorber based on a temperature of the adsorbent, the temperature of the adsorbent depending on a temperature of HTF flowing through pipes in the adsorber. The two adsorbers may operate asynchronously and cyclically, such that one adsorber is in an adsorbing mode with HTF from a cold HTF circuit flowing therethrough, while the other adsorber is in a desorbing mode with HTF from a hot HTF circuit flowing therethrough. As shown in FIG. 3, the hot HTF circuit may include a heat collector wherein engine exhaust heat is transferred to HTF, a PCM vessel wherein exhaust heat is stored in PCM, and a pump, and the cold HTF circuit may include an HTF cooler and a pump.

Figure 4:
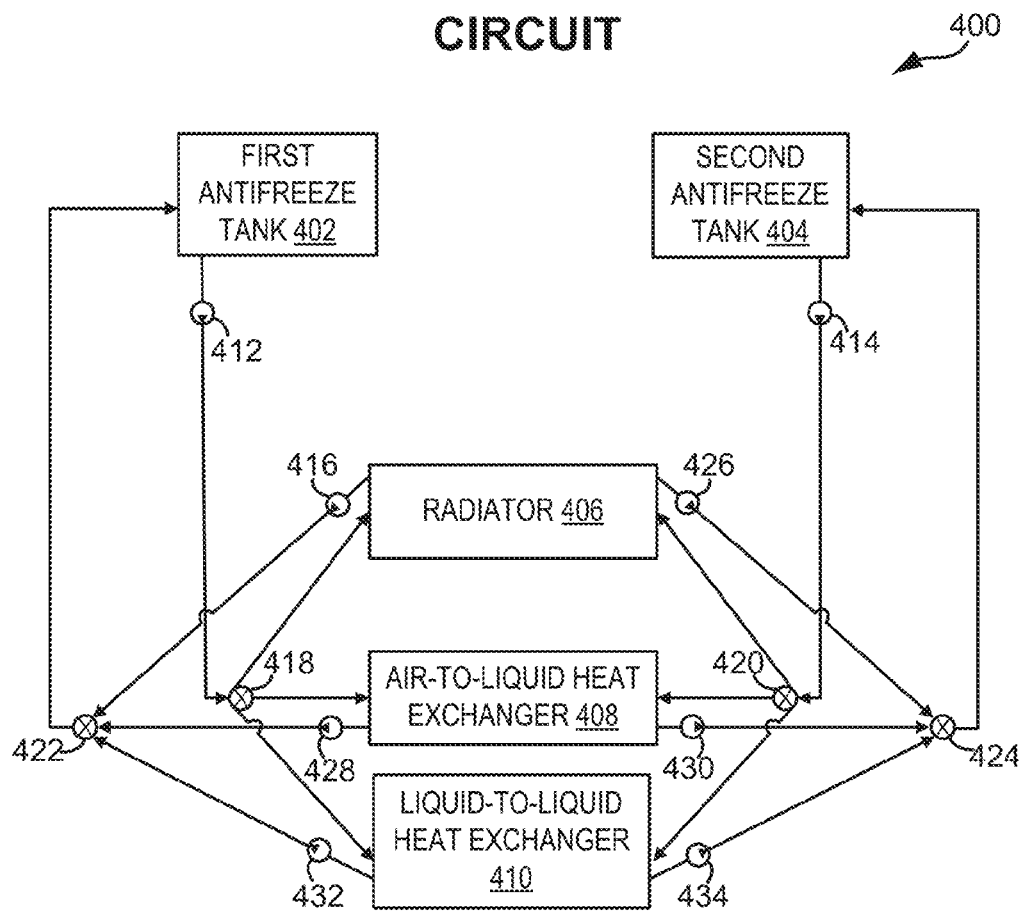
FIG. 4 schematically shows antifreeze circuits and associated components which may be included in the climate control system of FIG. 1.
Figure 5:
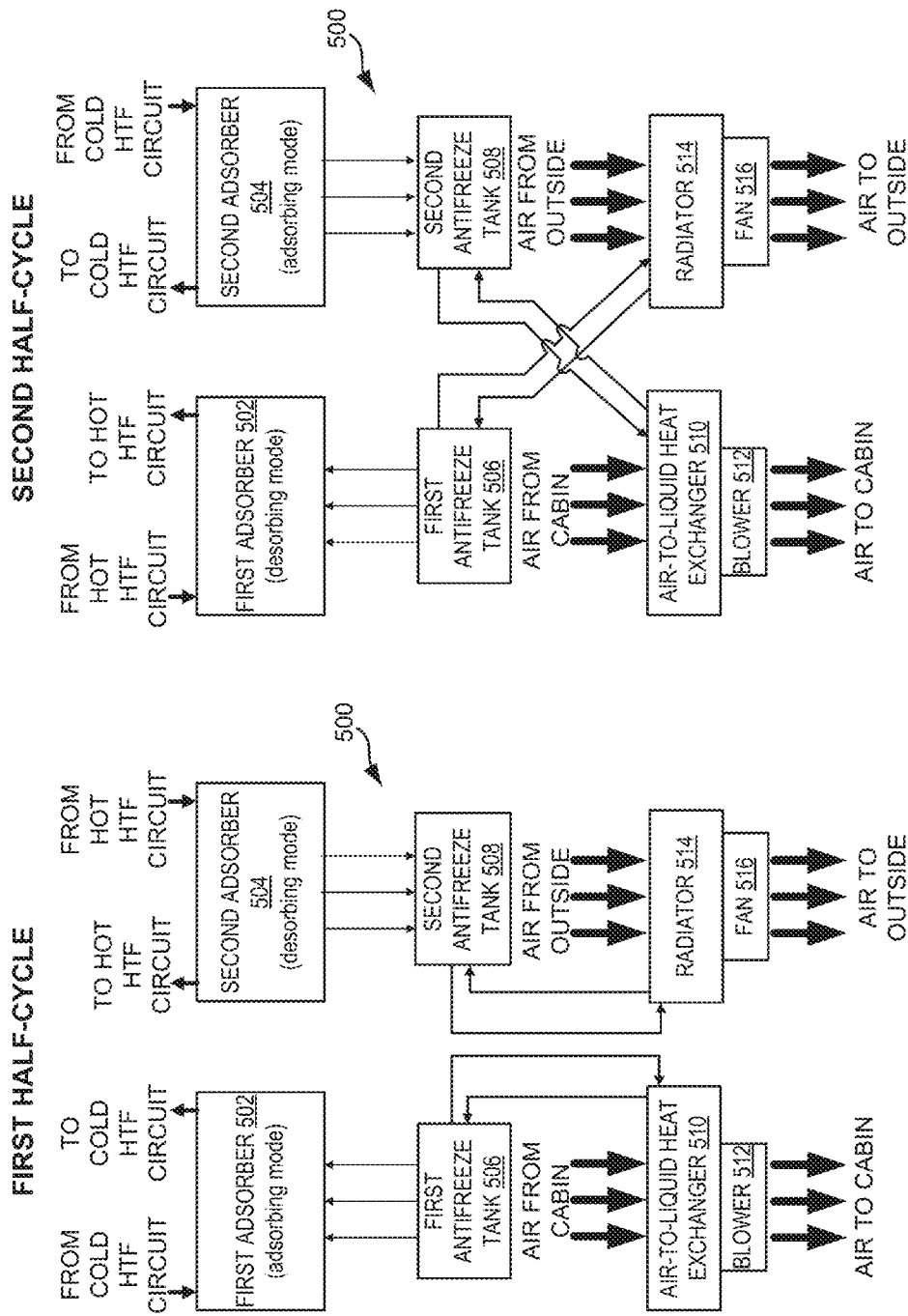
FIG. 5 schematically depicts the flow of HTF, antifreeze, refrigerant, and air among various components of the climate control system of FIG. 1 during a summer mode.

As shown in FIG. 4, the climate control system further includes antifreeze circuits routing antifreeze from the antifreeze tanks to a radiator, air-to-liquid heat exchanger, and liquid-to-liquid heat exchanger, depending on the mode of operation of the system. For example, as shown in FIG. 5, in a summer mode, antifreeze is routed from the antifreeze tank of the currently adsorbing adsorber to an air-to-liquid heat exchanger. Cabin air is blown across the air-to-liquid heat exchanger which cools the air before it is returned to the cabin to cool the cabin, whereas the antifreeze returns to the antifreeze tank at a slightly warmer temperature. At the same time, antifreeze is routed from the antifreeze tank of the currently desorbing adsorber to a radiator. A fan blows outside (ambient) air across the radiator, thereby slightly cooling the antifreeze before it is returned to the antifreeze tank. In contrast, during the mild winter mode shown in FIG. 6, antifreeze is routed from the antifreeze tank of the currently adsorbing adsorber to an air-to-liquid heat exchanger. Outside air is blown across the air-to-liquid heat exchanger which cools the air before the air is returned outside, whereas the antifreeze returns to the antifreeze tank at a slightly warmer temperature. At the same time, antifreeze is routed from the antifreeze tank of the currently desorbing adsorber to a radiator. A fan blows outside air across the radiator, thereby slightly cooling the antifreeze before it is returned to the antifreeze tank and warming the air, which is then routed to the cabin to heat the cabin.

Figure 7:
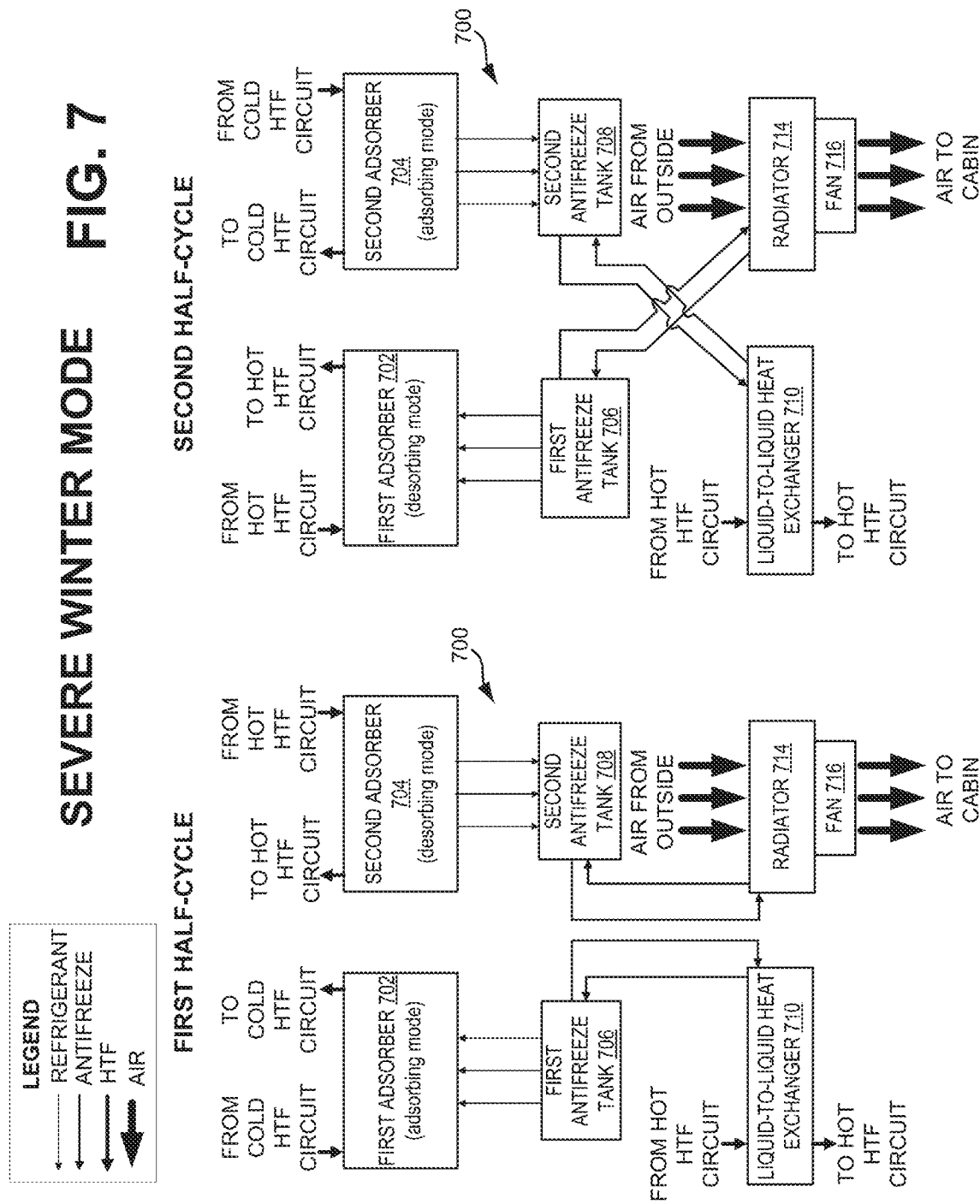
FIG. 7 schematically depicts the flow of HTF, antifreeze, refrigerant, and air among various components of the climate control system of FIG. 1 during a severe winter mode.

Further, during the severe winter mode shown in FIG. 7, antifreeze is routed from the antifreeze tank of the currently adsorbing adsorber to a liquid-to-liquid heat exchanger. Hot HTF from the hot HTF circuit flows through the liquid-to-liquid heat exchanger to heat the antifreeze so as to enable vapor formation in the wick chambers at low ambient temperatures. At the same time, antifreeze is routed from the antifreeze tank of the currently desorbing adsorber to a radiator. A fan blows outside air across the radiator, thereby slightly cooling the antifreeze before it is returned to the antifreeze tank and warming the air, which is then routed to the cabin to heat the cabin.

The above-described summer mode operation may be appropriate during hot weather conditions, when the weather is hotter relative to the weather during cold weather conditions (e.g., the air temperature is higher during hot weather than the air temperature during cold weather). The above-described mild or severe winter modes may be appropriate during cold weather conditions, when the weather is colder relative to the weather during hot weather conditions (e.g., the air temperature is lower during cold weather than the air temperature during hot weather). For example, summer mode operation may be appropriate when ambient temperature is greater than a first threshold. Mild winter mode operation may be appropriate when ambient temperature is less than a second threshold, which may be less than or equal to the first threshold. Severe winter mode operation may be appropriate when ambient temperature is less than a third threshold, which may be less than the first and second thresholds.

Figure 8:
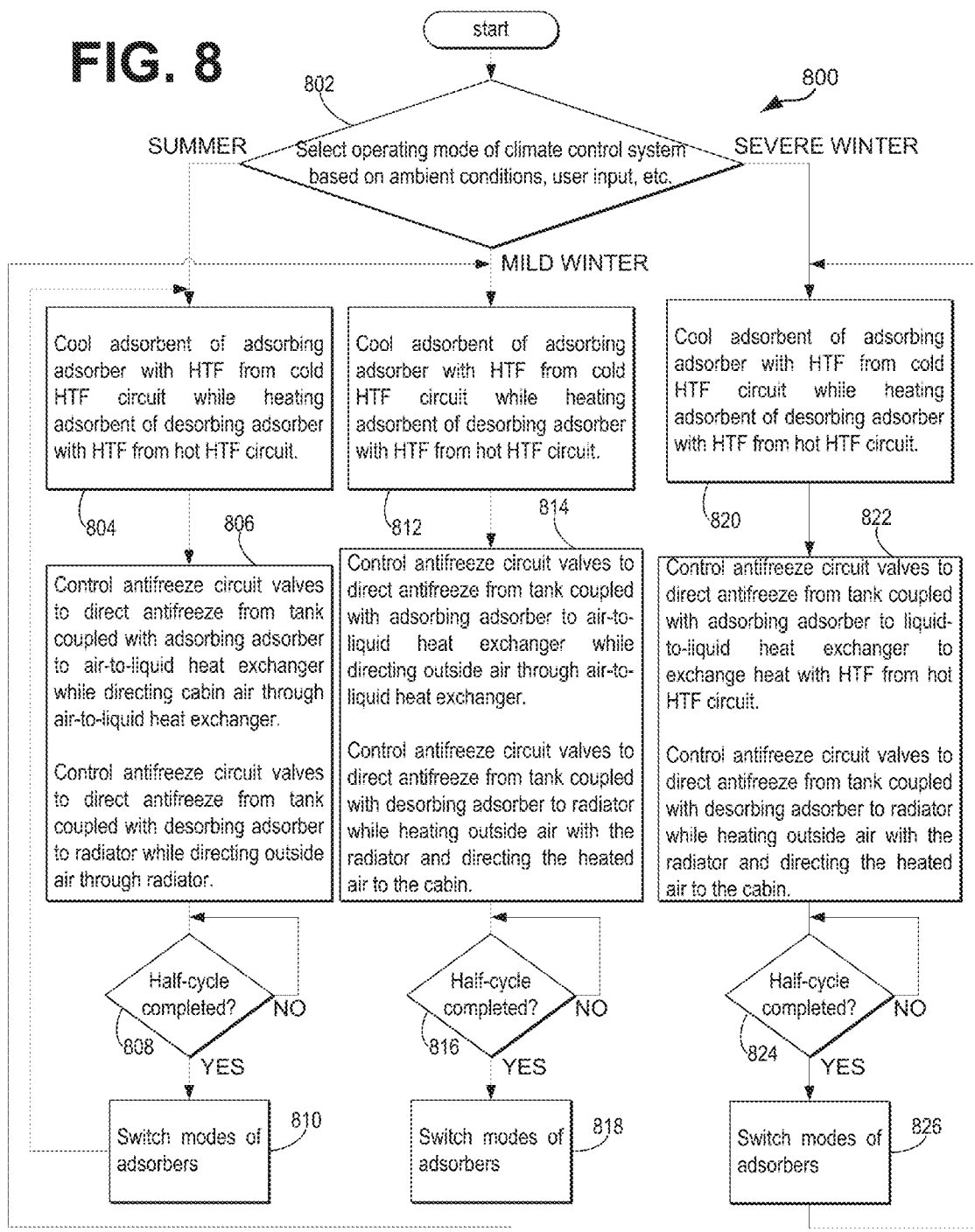
FIG. 8 depicts an example method for operating the climate control system of FIG. 1 during a summer, mild winter, or severe winter mode.

Finally, an example method for summer, mild winter, and severe winter mode operation of the climate control system is shown in FIG. 8, and an example method for surge cooling or surge heating operation of the climate control system is shown in FIG. 9.

Turning now to FIG. 1, an example embodiment of a vehicle climate control system 100 in a motor vehicle 102 is illustrated schematically. Vehicle 102 includes drive wheels 106, a passenger cabin 104, and an internal combustion engine 108. Internal combustion engine 108 includes a combustion chamber (not shown) which may receive intake air via an intake passage (not shown) and may exhaust combustion gases via exhaust passage 110. Motor vehicle 102 may be a road automobile, among other types of vehicles.

Unlike some vehicle climate control systems which may circulate coolant through the engine to absorb waste engine heat and distribute the heated coolant to a radiator and/or heater core via coolant lines, climate control system 100 may not fluidly communicate with engine 108. Further, climate control system 100 may include a thermal-adsorption heat pump 124 (described in further detail below) which is driven by thermal energy from engine exhaust rather than by an engine crankshaft or electrical motor. Accordingly, the only coordination between engine 108 and climate control system 100 may be the routing of the engine exhaust in exhaust passage 110 through an exhaust heat collector of climate control system 100, as will be detailed below. In this way, engine 108 may be largely freed from providing climate control in the vehicle, and climate control system 100 may not exert a load on engine 108. Further, as engine coolant may not circulate through climate control system 100, the volume of coolant in the engine may be reduced.

Some advantages of a reduced volume of engine coolant include quicker engine warm-up and thus reduced cold start emissions, for example.

FIG. 1 further shows a control system 114 of vehicle 102. Control system 114 may be communicatively coupled to various components of engine 108 and climate control system 100 to carry out the control routines and actions described herein. As shown in FIG. 1, control system 114 may include an electronic digital controller 112. Controller 112 may be a microcomputer, including a microprocessor unit, input/output ports, an electronic storage medium for executable programs and calibration values, random access memory, keep alive memory, and a data bus.

As depicted, controller 112 may receive input from a plurality of sensors 116, which may include user inputs and/or sensors (such as transmission gear position, transmission clutch position, gas pedal input, brake input, transmission selector position, vehicle speed, engine speed, mass airflow through the engine, ambient temperature, intake air temperature, etc.), climate control system sensors (such as HTF temperature, antifreeze temperature, adsorbent temperature, fan speed, passenger compartment temperature, desired passenger compartment temperature, ambient humidity, etc.), and others. As shown in FIG. 1, sensors 116 may include a fob sensor 120 configured to receive input from an electronic fob 122. Specifically, fob sensor 120 may remotely couple vehicle 102 to electronic fob 122, thereby enabling remote control of certain functions of vehicle 102. In one example, electronic fob 122 may remotely activate climate control system 100 so as to pre-condition cabin air. Depending on ambient conditions, for example as sensed by one or more of sensors 116, and/or user input, electronic fob 122 may remotely activate climate control system 100 to pre-condition cabin air prior to engine start, as will be detailed herein. Thus, a future vehicle operator or passenger may use electronic fob 122 in conjunction with the surge cooling/heating modes of climate control system 100, which will be detailed herein, to ensure that a desired cabin temperature will be present when they enter the vehicle.

In addition to enabling remote activation of climate control system 100, electronic fob 122 may enable a remote keyless entry into vehicle 102. In this case, fob sensor 120 may be further configured to provide an indication to controller 112 regarding the locked or unlocked position of vehicle doors.

Further, controller 112 may communicate with various actuators 118, which may include engine actuators (such as fuel injectors, an electronically controlled intake air throttle plate, spark plugs, transmission clutches, etc.), climate control system actuators (such as air handling vents and/or diverter valves, valves controlling the flow of HTF, valves controlling flow of antifreeze, blower actuators, fan actuators, etc.), and others. In some examples, the storage medium may be programmed with computer readable data representing instructions executable by the processor for performing the methods described below as well as other variants that are anticipated but not specifically listed.

As described above, climate control system 100 includes a thermal-adsorption heat pump 124 rather than a mechanical compressor. Thermal-adsorption heat pump 124 may include two structurally identical adsorbers which may operate asynchronously (one adsorber adsorbs while the other desorbs during operating modes other than the surge modes described herein) and cyclically (each adsorber periodically switches between adsorbing mode and desorbing mode).

FIG. 2A is a cross-sectional view of an example adsorber 200 in an adsorbing mode, whereas FIG. 2B is a cross-sectional view of adsorber 200 in a desorbing mode. Adsorber 200 may be one of two identical adsorbers included in thermal-adsorption heat pump 124 of climate control system 100 depicted in FIG. 1.

Adsorber 200 effects heat exchange between HTF and a chemical adsorbent (e.g. zeolite, silica gel, activated carbons). In the embodiments described herein, HTF flows through a fin tube 202, and an adsorbent 204 forms a coating on the surface of the fin tube. However, it will be appreciated that another suitable adsorption heat exchanger may be used in the climate control system described herein. For example, rather than a coating, adsorbent 204 could be metal foam, or another suitable type of highly porous metal-organic framework (MOF). Similarly, although a snaking arrangement of a single fin tube 202 is shown, multiple separate tubes may be used to carry HTF through the adsorbers, or HTF may flow through an integral channel of each adsorber, e.g. a channel spanning the circumference of the adsorber.

Fin tube 202 and adsorbent 204 are arranged within an enclosure 206 of adsorber 200. Depending on whether the adsorber is currently in an adsorbing or desorbing mode, a valve 208 may be controlled to direct HTF from either a hot HTF circuit or a cold HTF circuit into fin tube 202. Similarly, based on the current mode of the adsorber, a valve 210 downstream of a pump 226 may be controlled to direct HTF from the fin tube to either the hot HTF circuit or the cold HTF circuit. When adsorber 200 is in the adsorbing mode, as depicted in FIG. 2A, valve 208 is controlled to flow HTF from the cold HTF circuit through the adsorber, and valve 210 is controlled to flow HTF from the adsorber back to the cold HTF circuit. In contrast, when adsorber 200 is in the desorbing mode, as depicted in FIG. 2B, valve 208 is controlled to flow hot HTF from the hot HTF circuit through the adsorber, and valve 210 is controlled to flow HTF from the adsorber back to the hot HTF circuit. The hot and cold HTF circuits will be described further with respect to FIG. 3.

As shown, adsorber 200 is coupled with an antifreeze tank 212 via a plurality of wick chambers 214. The antifreeze tank stores antifreeze which flows in various antifreeze circuits, which will be described further with respect to FIG. 4. Whereas HTF transfers heat to adsorbent 204 and thereby affects the temperature of the antifreeze (due to the thermal coupling of the antifreeze tank and the adsorbents via the wick chambers), it is the antifreeze which transfers heat or cooling to the air in the passenger cabin via a radiator or air-to-liquid heat exchanger, as will be described with respect to FIGS. 4-7. The wick chambers 214 each comprise a pipe filled with wick material 216, where an inner channel 218 concentric to the pipe extends through the length of the wick material. As shown in FIGS. 2A and 2B, wick chambers 214 may protrude into the adsorber, and may fluidly communicate with enclosure 206 depending on an opening state of a valve 220. While adsorber 200 is shown with three wick chambers, in some embodiments, adsorber 200 may include another suitable number of wick chambers, including only one wick chamber.

A refrigerant may travel in a closed circuit, the closed circuit including the wick chambers and the enclosure. The refrigerant may be water, ammonia, R1234f, or another suitable refrigerant. The refrigerant may be stored in wick material 216 of each wick chamber 214 in liquid form. Under certain conditions, and depending on the opening state of valve 220, the refrigerant may vaporize and travel out of wick material 216 into channel 218 and then into enclosure 206. Similarly, under certain conditions, the refrigerant may travel from the adsorber enclosure 206 into the channel 214 and condense on the wick material.

It will be appreciated that although heat pipes may include wick chambers, wick chambers 214 are not heat pipes. For example, only one phase change may occur in wick chambers 214 during a given mode of operation (e.g., liquid refrigerant vaporizing during an adsorbing mode and vaporized refrigerant condensing in a desorbing mode), whereas the working fluid in heat pipes may undergoes multiple phase changes concurrently (e.g., heat pipes may include an evaporating end and a condensing end, such that a working fluid evaporates at one end and condenses at the other end simultaneously).

The principle of operation of a thermal-adsorption heat pump (e.g., thermal-adsorption heat pump 124 of climate control system 100) including two adsorbers (e.g., two adsorbers 200) will now be described.

During the adsorbing mode, as shown in FIG. 2A, the controller controls valve 208 to flow cold HTF through snaking fin tube 202 in enclosure 206 to cool adsorbent 204. The cooling of adsorbent 204 creates suction, which causes refrigerant stored in wick material 216 of wick chambers 214 to vaporize in channels 218. When valve 220 is in an open state, the vaporized refrigerant flows from channels 218 into enclosure 206 (due to the suction of the cooled adsorbent 204). Meanwhile, the evaporation of refrigerant in the wick chambers creates a cooling effect which cools the antifreeze in antifreeze tank 212. The cooled antifreeze is then routed out of an outlet 222 of the antifreeze tank to a radiator or heat exchanger, based on the current mode of operation of the climate control system, as will be described with respect to FIGS. 4-7. Depending on where the antifreeze is routed during a given mode of operation of the climate control system, the antifreeze returned to the antifreeze tank via an inlet 224 of the antifreeze tank is either warmer or cooler relative to the antifreeze leaving the antifreeze tank via outlet 222.

A desorbing mode may be performed after the adsorbing mode, wherein refrigerant adsorbed by the adsorbent in the enclosure from the wick chambers is desorbed and returned to the wick chambers. During the desorbing mode, as shown in FIG. 2B, the controller controls valve 208 to flow hot HTF through snaking fin tube 202, to heat adsorbent 204. The heating of the adsorbent effects desorption of refrigerant from the adsorbent. When valve 220 is in an open state, the desorbed refrigerant returns to channels 218 of wick chambers 214 and condenses on wick material 216. Meanwhile, the condensation of refrigerant in the wick chambers releases heat which heats the antifreeze in the antifreeze tank. The heated antifreeze is then routed out of outlet 222 of the antifreeze tank to a radiator or heat exchanger, based on the current mode of operation of the climate control system, as will be described with respect to FIGS. 4-7. Depending on where the antifreeze is routed during a given mode of operation of the climate control system, the antifreeze returned to the antifreeze tank via inlet 224 is either warmer or cooler relative to the antifreeze leaving the antifreeze tank via outlet 222.

Accordingly, by coupling an antifreeze tank to an adsorber via one or more wick chambers, antifreeze may be heated and cooled without a dedicated evaporator or condenser, which may improve vehicle efficiency. For example, condensing refrigerant via wick chambers rather than a dedicated condenser may advantageous, as condensers may utilize either an engine-driven or electrically-driven fan, whereas wick chambers do not including moving parts and are thermally driven. Further, evaporating refrigerant via wick chambers rather than a dedicated evaporator may be advantageous as evaporators may rely heavily on associated temperature and pressure regulating devices, orifice tubes, expansion valves, accumulators, etc. in order to function properly, whereas wick chambers may not rely as much, or at all, on such additional components. Furthermore, substituting wick chambers for an evaporator and a condenser may reduce the size of the climate control system, thereby reducing manufacturing costs and improving fuel economy.

The adsorbers of a thermal-adsorption heat pump may asynchronously alternate between adsorbing and desorbing modes while the engine is running. One cycle of operation of the thermal-adsorption heat pump may refer to a duration during which each adsorber has operated in both the adsorbing and desorbing modes. In one example, a cycle lasts 20-40 minutes, and a half-cycle lasts 10-20 minutes. During a first half cycle, a first adsorber may operate in the adsorbing mode while the second adsorber operates in the desorbing mode. During a second half cycle immediately following the first half cycle, the first adsorber may operate in the desorbing mode while the second adsorber operates in the adsorbing mode. The thermal-adsorption heat pump may repeat this cycle throughout operation of the climate control system, with the exception of certain climate control system operating modes which require adsorption or desorption to occur at both adsorbers simultaneously, as described below.

At engine shutdown, depending on a current operating mode of the climate control system, it may be desirable to either fully desorb or adsorb refrigerant at both adsorbers. In this way, the climate control system may be operated in a surge cooling or surge heating mode at the next engine start, to provide immediate delivery of cold air in the summer and warm air in the winter. Whereas alternative approaches may use heat stored in PCM to desorb $NH_3$ into a reservoir to provide surge cooling at engine start (e.g., until engine exhaust heats up HTF sufficiently to drive a thermal-adsorption heat pump) rather than relying on the thermal-adsorption heat pump to provide surge cooling, surge cooling as well as surge heating may be provided via a thermal-adsorption heat pump in accordance with the present invention. For example, surge cooling may be provided at engine start during the summer mode by operating both adsorbers in the adsorbing mode for a duration, either at engine start or prior to engine start (via a climate pre-conditioning remote starter), after having desorbed the adsorbers at the previous engine shutdown via heat stored in PCM. For example, a method for a operating a climate control system to provide surge cooling may include, during hot weather (e.g., when operating in a summer mode), operating both adsorbers of a thermal-adsorption heat pump in a desorbing mode for a duration after engine shutdown and operating both adsorbers in an adsorbing mode for a duration prior to or at a next engine start. Similarly, in the mild or severe winter mode, cool HTF may be used to fully adsorb the adsorbents of both adsorbers with refrigerant vapor at engine shutdown. Then, at engine start, both adsorbers may be operated in the desorbing mode for a duration, either at engine start or prior to engine start (via a climate pre-conditioning remote starter). For example, a method for a operating a climate control system to provide surge heating may include, during cold weather, operating both adsorbers in the adsorbing mode for a duration after engine shutdown and operating both adsorbers in the desorbing mode for a duration prior to or at a next engine start. In this way, surge heating may be provided at engine start.

For example, at engine shutdown during a summer mode of the climate control system, at both adsorbers, the controller may control valve 208 to flow hot HTF through fin tube 202 to heat adsorbent 204 and thereby effect desorption of refrigerant from the adsorbent. Although the hot HTF circuit is not receiving heat from engine exhaust at this time due to the engine being shut down, hot HTF may be discharged from a PCM vessel in the hot HTF circuit to desorb the adsorbents of both adsorbers. After desorbing the adsorbents of both adsorbers, the controller may control valve 220 to be in a closed position at both adsorbers, thereby isolating the wick chambers of each adsorber from the corresponding adsorber enclosure to reduce re-entry of refrigerant vapor from the wick chambers to the adsorbers while the engine is shut down (e.g., while the vehicle is parked). At or prior to the next engine start, the controller may control valve 220 to be in an open position at both adsorbers to recouple the wick chambers of each adsorber with the corresponding adsorber enclosure. Desorbing the adsorbents of both adsorbers of the thermal-adsorption heat pump at engine shutdown enables both adsorbers to be operated in the adsorbing mode for a duration (e.g., 2 to 5 minutes) when the engine is started up again. Operating both adsorbers in the adsorbing mode may effectively double the cooling power (relative to a thermal-adsorption heat pump operating with one adsorber in the adsorbing mode) so as to allow for immediate delivery of cold air for increased passenger comfort (and for other ancillary engine/vehicle cooling needs) during warm weather conditions. Such operation is referred to herein as a surge cooling mode.

As another example, at engine shutdown during a mild or severe winter mode, at both adsorbers, the controller may control valve 208 to flow cold HTF from the cold HTF circuit through fin tube 202 to cool adsorbent 204 and thereby effect adsorption of refrigerant at the adsorbent. After adsorbing both adsorbers, the controller may control valve 220 to be in a closed position at both adsorbers, thereby isolating the wick chambers of each adsorber from the corresponding adsorber enclosure to avoid refrigerant vapor from re-entering the adsorbers while the engine is shut down (e.g., while the vehicle is parked). At or prior to the next engine start, the controller may control valve 220 to be in an open position at both adsorbers to recouple the wick chambers of each adsorber with the corresponding adsorber. Adsorbing refrigerant at the adsorbents of both adsorbers of the thermal-adsorption heat pump at engine shutdown enables both adsorbers to be operated in the desorbing mode for a duration (e.g., 2 to 5 minutes) when the engine is started up again. As heat exchange with engine exhaust during engine start-up may not adequately heat HTF in the hot HTF circuit to perform desorption, heat stored in a PCM vessel may be used to heat the HTF at this time. Operating both adsorbers in the desorbing mode may effectively double the heating power (relative to a thermal-adsorption heat pump operating with one adsorber in the desorbing mode) so as to allow for immediate delivery of hot air for increased passenger comfort (and for other ancillary engine/vehicle heating needs) during cold weather conditions. Such operation is referred to herein as a surge heating mode.

In some embodiments, the surge cooling and heating modes may commence prior to engine start-up. For example, a user may remotely activate the climate control system prior to starting the engine, for example via electronic fob 122 shown in FIG. 1, which may in turn activate the surge cooling mode (e.g., during warm weather conditions) or the surge heating mode (e.g., during cold weather conditions) prior to engine start.

As described above, heating and cooling of the adsorbents may be provided by a hot HTF circuit and a cold HTF circuit, respectively. FIG. 3 schematically shows an example embodiment of a hot HTF circuit 300 and a cold HTF circuit 302, as well as a thermal-adsorption heat pump 308. Thermal-adsorption heat pump 308 may be included in climate control system 100 of FIG. 1 as thermal-adsorption heat pump 124, for example, and may include the structure shown in FIGS. 2A and 2B.

The HTF flowing in hot and cold HTF circuits 300 and 302 may be an HTF with a high boiling point which can be used in both high-temperature applications (e.g., heat exchange with high-temperature engine exhaust) and low-temperature applications (e.g., during severe winter conditions). In one example, the HTF in hot and cold HTF circuits 300 and 302 may be a petroleum-based HTF.

Hot HTF circuit 300 enables desorption at thermal-adsorption heat pump 308 by heating HTF that is circulated by a pump 316 between an exhaust heat collector 304, a PCM vessel 306, and first and second adsorbers 318 and 320 of heat pump 308. As shown in FIG. 3, exhaust heat collector 304 is coupled with an engine exhaust pipe 310. HTF may flow through exhaust heat collector 304, and heat from the engine exhaust flowing through pipe 310 at exhaust heat collector 304 may be transferred to the HTF flowing therethrough.

A PCM vessel 306 may be arranged downstream of heat collector 304. PCM vessel 306 is a vessel which stores heat in PCM, the PCM absorbing heat when changing state from solid to liquid and releasing heat when changing state from liquid to solid. Such vessels may alternatively be referred to as heat batteries. PCM vessel 306 may be insulated to reduce dissipation of heat stored therein. For example, PCM vessel 306 may be a double-walled vessel, and a vacuum jacket may be positioned between outer and inner walls of the vessel to provide vacuum insulation. HTF flowing in hot HTF circuit 300 may enter an inlet of PCM vessel 306 and exit an outlet of PCM vessel 306. In one example, the PCM within PCM vessel 306 may be arranged in one or more PCM stacks supported between retention plates, each stack including a plurality of PCM elements arranged radially about a central feed passage. The HTF entering the inlet of the vessel may flow through the central feed passage where it may flow radially from the center feed passage to the plurality of PCM elements, to store thermal energy therein.

Depending on the type or types of PCM included in PCM vessel 306, among other factors, PCM vessel 306 may retain a percentage of the heat stored therein during engine operation for a duration after engine shutdown. In one example, 80% of the heat stored in PCM vessel 306 during engine operation may remain stored for at least 16 hours after engine shutdown. As such, PCM vessel 306 may supply hot HTF to adsorbers of the thermal-adsorption heat pump described herein even while the engine is shut down, e.g. to enable the surge cooling and heating modes described herein which may require hot HTF. It will be appreciated that heat stored in PCM vessel 306 may be discharged without starting the engine, e.g. via remote control by a user while the engine is shut down. For example, a user may remotely activate the climate control system prior to starting the engine, for example via electronic fob 122 shown in FIG. 1, which may cause the controller to control climate control system 100 to discharge hot HTF stored in the PCM vessel for use in a surge heating or cooling mode.

PCM vessel 306 may be arranged in parallel with a conduit 312 including a bypass valve 314. HTF may flow in conduit 312, thereby bypassing PCM vessel 306, depending on a position of bypass valve 314. For example, when bypass valve 314 is in a fully closed position, all of the HTF leaving heat collector 304 may flow to PCM vessel 306, where it may effect storage of heat in PCM. Alternatively, when bypass valve 314 is in a fully open position, all of the HTF leaving heat collector 304 may bypass PCM vessel 306 and flow through conduit 312. A pump 316 may be arranged downstream of PCM vessel 306 and bypass valve 314; the controller may control pump 316 to induce HTF flow from heat collector 304 through PCM vessel 306 and/or conduit 312, depending on the position of bypass valve 314. Thermal-adsorption heat pump 308 may fluidly communicate with the hot HTF circuit downstream of pump 316, as will be described below.

Cold HTF circuit 302 enables adsorption at thermal-adsorption heat pump 308 by cooling HTF that is circulated by a pump 336 between adsorbers 318 and 320 of heat pump 308 and an HTF cooler 338. HTF cooler 338 may be a device which can maintain HTF temperature within a desired range (e.g., 30 to 40° C.). For example, HTF cooler 338 may be an air-to-liquid heat exchanger. A fan (not shown) may direct ambient air across HTF cooler 338 to effect heat transfer between HTF flowing therethrough and the ambient air, thereby cooling the HTF. As shown in FIG. 3, pump 336 is arranged downstream of HTF cooler 338. Cold HTF circuit 302 may fluidly communicate with thermal-adsorption heat pump 308 downstream of pump 336, as will be described below.

Pump 316 of hot HTF circuit 300 and pump 336 of cold HTF circuit 302 may selectively communicate with thermal-adsorption heat pump 308 depending on the positions of various valves. As described above, thermal-adsorption heat pump 308 includes first adsorber 318 and second adsorber 320, which may each have the structure of adsorber 200 of FIGS. 2A and 2B. Thermal-adsorption heat pump 308 further includes a first plurality of wick chambers 322 coupling first adsorber 318 with a first antifreeze tank 324, and a second plurality of wick chambers 326 coupling second adsorber 320 with a second antifreeze tank 328. The first and second antifreeze tanks 324 and 328 may each have the structure of antifreeze tank 212 of FIGS. 2A and 2B, and each wick chamber of the first and second pluralities of wick chambers 322 and 326 may have the structure of wick chambers 214 of FIGS. 2A and 2B. Alternatively, the components of thermal-adsorption heat pump 308 may have another suitable structure which functions in accordance with the principle of operation of the thermal-adsorption heat pump described with respect to FIGS. 2A and 2B.

A position of a hot HTF delivery valve 330 arranged downstream of pump 316 in the hot HTF circuit may determine whether the hot HTF circuit communicates with one, both, or none of first and second adsorbers 318 and 320. Similarly, a position of a cold HTF delivery valve 340 arranged downstream of pump 336 in the cold HTF circuit may determine whether the cold HTF circuit communicates with one, both, or none of first and second adsorbers 318 and 320. First adsorber 318 includes a first HTF inlet valve 332, and second adsorber 320 includes a second HTF inlet valve 334. Valve 332 communicates with the hot HTF circuit, the cold HTF circuit, and the first adsorber, whereas valve 334 communicates with the hot HTF circuit, the cold HTF circuit, and the second adsorber. Valves 332 and 334 may perform the same function as valve 208 of FIGS. 2A and 2B; for example, depending on whether the first adsorber is currently in an adsorbing or desorbing mode, the first HTF inlet valve may be controlled to allow communication between either the hot HTF circuit or the cold HTF circuit and the first adsorber. Based on the position of valve 332, HTF from the hot HTF circuit, HTF from the cold HTF circuit, or no HTF may enter the first adsorber 318. Likewise, based on the position of valve 334, HTF from the hot HTF circuit, HTF from the cold HTF circuit, or no HTF may enter the second adsorber 320.

Valves 330, 332, 334, and 340 may cooperate to direct HTF from the hot and/or cold HTF circuits to the appropriate adsorber(s) during a given climate control system operating mode and during a given operating mode of each adsorber. For example, during a summer, mild winter, or severe winter operating mode of the climate control system, and while the first adsorber is adsorbing and the second adsorber is desorbing, the controller may control the position of valve 330 to direct hot HTF flow to the second adsorber but not the first adsorber, while controlling the position of valve 340 to direct cold HTF flow to the first adsorber but not the second adsorber. The controller may further control a position of valves 332 and 334 such that HTF from the hot HTF circuit may enter the second adsorber and HTF from the cold HTF circuit may enter the first adsorber. Then, after a half-cycle of the thermal-adsorption heat pump, the first and second adsorbers will switch such that the second adsorber is adsorbing and the first adsorber is desorbing. To effect the switch, the controller may control the position of valve 330 to direct hot HTF flow to the first adsorber but not the second adsorber, while controlling the position of valve 340 to direct cold HTF flow to the second adsorber but not the first adsorber. The controller may further control a position of valves 332 and 334 such that HTF from the cold HTF circuit may enter the second adsorber and HTF from the hot HTF circuit may enter the first adsorber. After another half-cycle has elapsed, the first and second adsorbers may switch again such that the second adsorber is desorbing and the first adsorber is adsorbing. The first and second adsorbers may switch between adsorbing and desorbing modes in this way throughout operation of the climate control system in the summer, mild winter, or severe winter operating modes.

In contrast, at engine shutdown and prior to or at engine start, the controller may control the positions of valves 330, 332, 334, and 340 differently to achieve surge heating or cooling modes, depending on ambient conditions. For example, at engine shutdown during summer mode operation, the controller may control the valves such that desorption occurs at both adsorbers. For example, the controller may control valve 330 to direct hot HTF flow to both adsorbers, and may further control the positions of valves 332 and 334 to communicate both the first and second adsorbers with the hot HTF circuit. As described above with respect to FIGS. 2A and 2B, during this operation, each adsorber enclosure may be isolated from the associated wick chambers and antifreeze tank. Then, at the next engine start (or prior to the next engine start), the controller may control the valves such that adsorption occurs at both adsorbers. For example, the controller may control valve 340 to direct cold HTF flow to both adsorbers, and may further control the positions of valves 332 and 334 to communicate both the first and second adsorbers with the cold HTF circuit.

In contrast, at engine shutdown during mild or severe winter mode operation, the controller may control the valves such that adsorption occurs at both adsorbers. For example, the controller may control valve 340 to direct cold HTF flow to both adsorbers, and may further control the positions of valves 332 and 334 to communicate both the first and second adsorbers with the cold HTF circuit. As described above with respect to FIGS. 2A and 2B, during this operation, each adsorber enclosure may be isolated from the associated wick chambers and antifreeze tank. Then, at the next engine start (or prior to the next engine start), the controller may control the valves such that desorption occurs at both adsorbers. For example, the controller may control valve 340 to direct hot HTF flow to both adsorbers, and may further control the positions of valves 332 and 334 to communicate both the first and second adsorbers with the hot HTF circuit.

As described above with respect to FIG. 2, based on the current mode of each adsorber, a valve downstream of a pump is controlled to direct HTF from the fin tube of that adsorber to either the hot HTF circuit or the cold HTF circuit. As shown in FIG. 3, a first HTF outlet valve 348 is arranged downstream of a first HTF outlet pump 352 at an HTF outlet of the first adsorber, and a second HTF outlet valve 350 is arranged downstream of second HTF outlet pump 354 at an HTF outlet of the second adsorber. Like pump 226 of FIGS. 2A and 2B, pumps 352 and 354 may pump HTF from the fin tubes of the first and second adsorbers, respectively, to the hot HTF circuit or the cold HTF circuit depending on positions of valves 348 and 350 as well as positions of a hot HTF return valve 344 and a cold HTF return valve 346.

For example, when the first adsorber is in adsorbing mode and the second adsorber is in desorbing mode, the controller may control the positions of valves 344, 346, 348, and 350 such that HTF leaving the first adsorber returns to the cold HTF circuit and HTF leaving the second adsorber returns to the hot HTF circuit. Similarly, when the first adsorber is in desorbing mode and the second adsorber is in adsorbing mode, the controller may control the positions of valves 344, 346, 348, and 350 such that HTF leaving the first adsorber returns to the hot HTF circuit and HTF leaving the second adsorber returns to the cold HTF circuit. It will be appreciated that when hot HTF flows through both of the adsorbers, for example during the surge modes described herein, valve 344 may be controlled such that hot HTF from both adsorbers is directed back to the hot HTF circuit (e.g., upstream of heat collector 304 as shown in FIG. 3). Similarly, it will be appreciated that when cold HTF flows through both of the adsorbers, for example during the surge modes described herein, valve 346 may be controlled such that cold HTF from both adsorbers is directed back to the cold HTF circuit (e.g., upstream of HTF cooler 338 as shown in FIG. 3).

Further, as shown in FIG. 3, the hot HTF circuit may communicate with a liquid-to-liquid heat exchanger 356, depending on a position of valve 330. For example, during a severe winter mode, the controller may direct antifreeze from the antifreeze tank of the currently adsorbing adsorber to flow through a liquid-to-liquid heat exchanger, while controlling valve 330 to direct HTF from the hot HTF circuit to the liquid-to-liquid heat exchanger to exchange heat with the antifreeze flowing through the liquid-to-liquid heat exchange (via antifreeze circuit 400 of FIG. 4, described below). In this way, vapor formation in the wick chambers (and thus adsorption) may be possible even at low ambient temperatures.

As described above, cooling or heating of the adsorbents within the adsorbers via the HTF circuits shown in FIG. 3 causes evaporation or condensation of refrigerant at the wick chambers coupled with the adsorbers, and the evaporation or condensation at the wick chambers effects cooling or heating of antifreeze within the antifreeze tanks in which the wick chambers are disposed. The cooled/heated antifreeze may then be routed to various components of the climate control system to cool or heat passenger cabin air, as shown in FIG. 4. During a given mode of operation of the climate control system and depending on whether a given adsorber is adsorbing or desorbing, as shown in FIG. 4, antifreeze may be routed from the antifreeze tank coupled with that adsorber to a radiator, air-to-liquid heat exchanger, or liquid-to-liquid heat exchanger.

As shown in FIG. 4, an antifreeze circuit 400 includes a first antifreeze tank 402 and a second antifreeze tank 404. Although tanks 402 and 404 are depicted in FIG. 4 as discrete components, it will be appreciated that these tanks may be included in a thermal-adsorption heat pump, such as thermal-adsorption heat pump 308 of FIG. 3. For example, tanks 402 and 404 may correspond to tanks 324 and 328 of FIG. 3, and may be coupled with adsorbers such as adsorbers 318 and 320 of FIG. 3 via wick chambers. Heating and cooling of the passenger cabin may be achieved via the routing of antifreeze from each tank to and from a radiator 406, an air-to-liquid heat exchanger 408, or a liquid-to-liquid heat exchanger 410.

Pumps may be arranged downstream of outlets of each tank to induce flow of antifreeze from the tanks to the radiator, air-to-liquid heat exchanger, or liquid-to-liquid heat exchanger. For example, as shown in FIG. 4, a first outlet pump 412 may be arranged downstream of an outlet of first antifreeze tank 402, and a second outlet pump 414 may be arranged downstream of an outlet of second antifreeze tank 404. Further, pumps may be arranged downstream of outlets of each of radiator 406, air-to-liquid heat exchanger 408, and liquid-to-liquid heat exchanger 410. For example, as shown in FIG. 4, first and second radiator outlet pumps 416 and 426 may be arranged downstream of first and second outlets of radiator 406, first and second air-to-liquid heat exchanger outlet pumps 428 and 430 may be arranged downstream of first and second outlets of air-to-liquid heat exchanger 408, and first and second liquid-to-liquid heat exchanger outlet pumps 432 and 434 may be arranged downstream of first and second outlets of liquid-to-liquid heat exchanger 410.

Valves may be arranged downstream of the outlet of each antifreeze tank, and upstream of an inlet of each antifreeze tank, to direct antifreeze flow to and from the appropriate destination based on the current operating mode of the climate control system and the current operating mode of the adsorber communicating with each tank. As shown in FIG. 4, a first outlet valve 418 may be arranged downstream of first outlet pump 412 and upstream of radiator 406, air-to-liquid heat exchanger 408, and liquid-to-liquid heat exchanger 410. Depending on a position of valve 418, antifreeze leaving the outlet of the first antifreeze tank may be directed to the radiator, the air-to-liquid heat exchanger, or the liquid-to-liquid heat exchanger. Similarly, a second outlet valve 420 may be arranged downstream of second outlet pump 414 and upstream of radiator 406, air-to-liquid heat exchanger 408, and liquid-to-liquid heat exchanger 410. Depending on a position of valve 420, antifreeze leaving the outlet of the second antifreeze tank may be directed to the radiator, the air-to-liquid heat exchanger, or the liquid-to-liquid heat exchanger. Further, as shown in FIG. 4, a first inlet valve 422 may be arranged upstream of the inlet of the first antifreeze tank. Depending on a position of valve 422, antifreeze leaving the radiator, the air-to-liquid heat exchanger, or the liquid-to-liquid heat exchanger may be routed into the first antifreeze tank. Similarly, a second inlet valve 424 may be arranged upstream of the inlet of the second antifreeze tank. Depending on a position of valve 424, antifreeze leaving the radiator, the air-to-liquid heat exchanger, or the liquid-to-liquid heat exchanger may be routed into the second antifreeze tank. It will be appreciated that in other embodiments, during certain conditions, antifreeze may be directed from the antifreeze tanks to more than one of the radiator, air-to-liquid heat exchanger, and liquid-to-liquid heat exchanger, without departing from the scope of this disclosure. Similarly, at a given time, antifreeze may be directed from more than one of the radiator, air-to-liquid heat exchanger, and liquid-to-liquid heat exchanger without departing from the scope of this disclosure.

The routing of antifreeze during each of the summer, mild winter, and severe winter operating modes will be described with respect to FIGS. 5-7. It will be appreciated that the antifreeze circuit configuration shown in FIG. 4, for example the various valves, pumps, conduits, and their positioning, is merely exemplary. Another suitable configuration which routes antifreeze from each tank to the appropriate destination during a given operating mode may be used without departing from the scope of this disclosure.

FIG. 5 schematically depicts the flow of HTF, antifreeze, refrigerant, and air among various components of the climate control system (e.g., climate control system 100 shown in FIG. 1 including adsorber 200 of FIG. 2, the thermal-adsorption heat pump and HTF circuits of FIG. 3, and the antifreeze circuit of FIG. 4) during the summer mode. The summer mode may be appropriate during warm weather conditions, including but not limited to warm weather conditions during the summer season. For example, in warm climates, vehicles including the climate control system described herein may operate the climate control system in summer mode during most or all of the year. As shown in FIG. 5, a thermal-adsorption heat pump 500 includes a first adsorber 502, a second adsorber 504, a first antifreeze tank 506, and a second antifreeze tank 508.

During a first half-cycle of operation of heat pump 500, first adsorber 502 is in adsorbing mode, and second adsorber 504 is in desorbing mode. As such, first adsorber 502 communicates with the cold HTF circuit, whereas second adsorber 504 communicates with the hot HTF circuit, in the manner described above with reference to FIG. 3. Because first adsorber 502 is adsorbing refrigerant, antifreeze in first antifreeze tank 506 is cooled due to the evaporating of refrigerant at the wick chambers coupling the tank with the adsorber. The cooled antifreeze is routed from the first antifreeze tank to an air-to-liquid heat exchanger 510. Air-to-liquid heat exchanger 510 may operate in conjunction with a blower 512 to effect heat exchange between air from the passenger cabin and antifreeze from the first antifreeze tank. This heat exchange cools the air, which is subsequently returned to the cabin to provide cooling. After flowing through air-to-liquid heat exchanger 510, antifreeze returns to the first antifreeze tank at a slightly warmer temperature than the temperature it was at when it left the tank. For example, antifreeze may leave the first antifreeze tank at a temperature of $7\pm2°$ C., whereas antifreeze may return to the first antifreeze tank at a temperature of $11\pm2°$ C. after exchanging heat with cabin air at the air-to-liquid heat exchanger. Meanwhile, as second adsorber 504 is desorbing refrigerant, antifreeze in second antifreeze tank 508 is warmed due to the condensing of refrigerant at the wick chambers coupling the tank with the adsorber. The warmed antifreeze is routed from the second antifreeze tank to a radiator 514. Radiator 514 may operate in conjunction with a fan 516 to effect heat exchange between ambient air (e.g., air from outside of the vehicle) and antifreeze from the second antifreeze tank. This heat exchange warms the air, which is subsequently returned to outside of the vehicle. After flowing through radiator 514, antifreeze returns to the second antifreeze tank at a slightly cooler temperature than the temperature it was at when it left the tank. For example, antifreeze may leave the second antifreeze tank at a temperature of $45\pm2°$ C., whereas antifreeze may return to the second antifreeze tank at a temperature of $40\pm2°$ C. after exchanging heat with outside air at the radiator.

During a second half-cycle of operation of heat pump 500, first adsorber 502 is in desorbing mode, and second adsorber 504 is in adsorbing mode. As shown, during the second half-cycle, the routing of antifreeze is different relative to the first half-cycle; antifreeze is routed from the second antifreeze tank to the air-to-liquid heat exchanger to exchange heat with cabin air and thereby cool the cabin, while antifreeze is routed from the first antifreeze tank to the radiator to reject heat to outside air.

As described above, in one example, each cycle lasts 20-40 minutes, and thus each half-cycle lasts 10-20 minutes. After the second half-cycle, the heat pump begins a subsequent operation cycle by operating in accordance with the first half-cycle, and the heat pump continues to alternate between the first and second half-cycles while the engine is on and the climate control system is operating.

Figure 6:
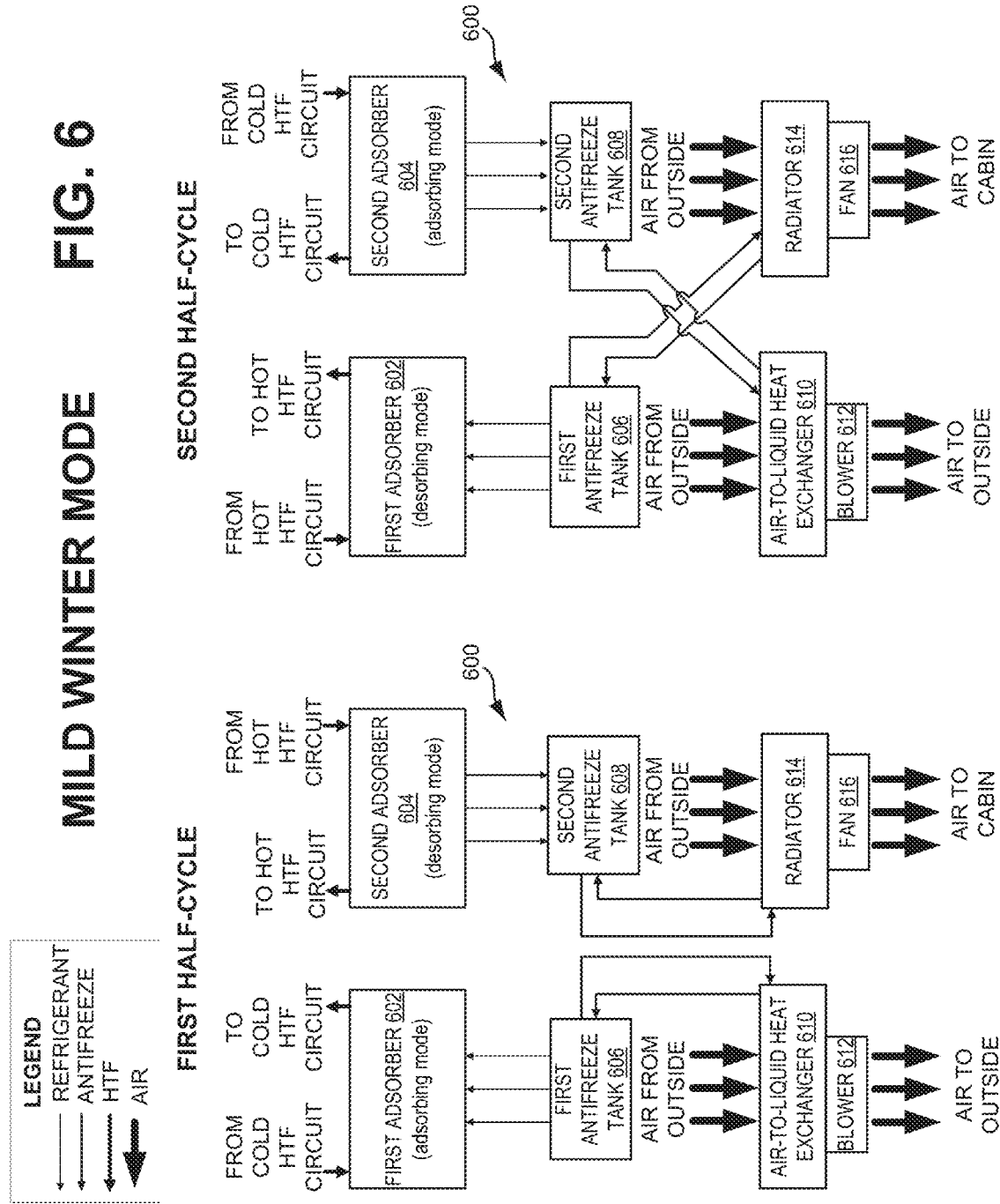
FIG. 6 schematically depicts the flow of HTF, antifreeze, refrigerant, and air among various components of the climate control system of FIG. 1 during a mild winter mode.

FIG. 6 schematically depicts the flow of HTF, antifreeze, refrigerant, and air among various components of the climate control system (e.g., climate control system 100 shown in FIG. 1 including adsorber 200 of FIG. 2, the thermal-adsorption heat pump and HTF circuits of FIG. 3, and the antifreeze circuits of FIG. 4) during a mild winter mode. The mild winter mode may be appropriate during moderately cold weather conditions, including but not limited to moderately cold weather conditions during the winter season. For example, in moderately cold climates, vehicles including the climate control system described herein may operate the climate control system in mild winter mode during most or all of the year. As shown in FIG. 6, a thermal-adsorption heat pump 600 includes a first adsorber 602, a second adsorber 604, a first antifreeze tank 606, and a second antifreeze tank 608.

During a first half-cycle of operation of heat pump 600, first adsorber 602 is in adsorbing mode, and second adsorber 604 is in desorbing mode. As such, first adsorber 602 communicates with the cold HTF circuit, whereas second adsorber 604 communicates with the hot HTF circuit, in the manner described above with reference to FIG. 3. Because first adsorber 602 is adsorbing refrigerant, antifreeze in first antifreeze tank 606 is cooled due to the evaporating of refrigerant at the wick chambers coupling the tank with the adsorber. The cooled antifreeze is routed from the first antifreeze tank to an air-to-liquid heat exchanger 610. Air-to-liquid heat exchanger 610 may operate in conjunction with a blower 612 to effect heat exchange between outside air and antifreeze from the first antifreeze tank. This heat exchange cools the air, which is subsequently returned to outside of the vehicle. After flowing through air-to-liquid heat exchanger 610, antifreeze returns to the first antifreeze tank at a slightly warmer temperature than the temperature it was at when it left the tank. For example, antifreeze may leave the first antifreeze tank at a temperature of $7\pm2°$ C., whereas antifreeze may return to the first antifreeze tank at a temperature of $11\pm2°$ C. after exchanging heat with outside air at the air-to-liquid heat exchanger. Meanwhile, as second adsorber 604 is desorbing refrigerant, antifreeze in second antifreeze tank 608 is warmed due to the condensing of refrigerant at the wick chambers coupling the tank with the adsorber. The warmed antifreeze is routed from the second antifreeze tank to a radiator 614. Radiator 614 may operate in conjunction with a fan 616 to effect heat exchange between ambient air (e.g., air from outside of the vehicle) and antifreeze from the second antifreeze tank. This heat exchange warms the air, which is subsequently directed to the passenger cabin to provide heating to the cabin. After flowing through radiator 614, antifreeze returns to the second antifreeze tank at a slightly cooler temperature than the temperature it was at when it left the tank. For example, antifreeze may leave the second antifreeze tank at a temperature of 45±2° C., whereas antifreeze may return to the second antifreeze tank at a temperature of 40±2° C. after exchanging heat with outside air at the radiator.

During a second half-cycle of operation of heat pump 600, first adsorber 602 is in desorbing mode, and second adsorber 604 is in adsorbing mode. As shown, during the second half-cycle, the routing of antifreeze is different relative to the first half-cycle; antifreeze is routed from the second antifreeze tank to the air-to-liquid heat exchanger to exchange heat with outside air, while antifreeze is routed from the first antifreeze tank to the radiator to exchange heat with outside air and direct the heated outside air to the passenger cabin to heat the cabin.

When ambient temperatures are severely cold, the mild winter mode may be unable to provide desired heating to the passenger cabin. For example, heat exchange between antifreeze from the antifreeze tank of the adsorbing adsorber and outside air at severely cold ambient temperatures may not adequately heat the antifreeze, and as a result refrigerant in the wick chambers may be unable to vaporize as needed for adsorption. Accordingly, the climate control system may be operated in a severe winter mode during such conditions.

FIG. 7 schematically depicts the flow of HTF, antifreeze, refrigerant, and air among various components of the climate control system (e.g., climate control system 100 shown in FIG. 1 including adsorber 200 of FIG. 2, the thermal-adsorption heat pump and HTF circuits of FIG. 3, and the antifreeze circuits of FIG. 4) during the severe winter mode. As shown in FIG. 7, a thermal-adsorption heat pump 700 includes a first adsorber 702, a second adsorber 704, a first antifreeze tank 706, and a second antifreeze tank 708.

During the severe winter mode, ambient temperatures may be so low that additional heating of the antifreeze in the tank of the adsorbing adsorber is needed to enable vapor formation at the wick chambers. The additional heating of the antifreeze may be supplied via heat transfer with hot HTF in the hot HTF loop (e.g., at a liquid-to-liquid heat exchanger). As detailed below, in one example, during a severe winter mode, a method for operation of a climate control system may include heating antifreeze from the antifreeze tank of an adsorbing adsorber of a thermal-adsorption heat pump via heat exchange with HTF from a hot HTF circuit.

During a first half-cycle of operation of heat pump 700, first adsorber 702 is in adsorbing mode, and second adsorber 704 is in desorbing mode. As such, first adsorber 702 communicates with the cold HTF circuit, whereas second adsorber 704 communicates with the hot HTF circuit, in the manner described above with reference to FIG. 3. During severe winter conditions, the antifreeze in the tank coupled with the adsorbing adsorber may be so cold that vapor formation (and thus, adsorption) is inhibited, and thus antifreeze may be routed from the first antifreeze tank to a liquid-to-liquid heat exchanger 710 to ensure that the antifreeze is warm enough for adsorption. Antifreeze from the first antifreeze tank may exchange heat with HTF from the hot HTF circuit via liquid-to-liquid heat exchanger 710. After flowing through liquid-to-liquid heat exchanger 710, antifreeze returns to the first antifreeze tank at a slightly warmer temperature than the temperature it was at when it left the tank. For example, antifreeze may leave the first antifreeze tank at a temperature of 7±2° C., whereas antifreeze may return to the first antifreeze tank at a temperature of 11±2° C. after exchanging heat with hot HTF at the liquid-to-liquid heat exchanger. Accordingly, via heat exchange with hot HTF from the hot HTF circuit, the antifreeze in the tank of the adsorbing adsorber may be actively heated so as to enable vapor formation in the wick chambers. The vapor may then be adsorbed by the adsorbent of the adsorbing adsorber even at low ambient temperatures.

Meanwhile, as second adsorber 704 is desorbing refrigerant, antifreeze in second antifreeze tank 708 is warmed due to the condensing of refrigerant at the wick chambers coupling the tank with the adsorber. The warmed antifreeze is routed from the second antifreeze tank to a radiator 714. Radiator 714 may operate in conjunction with a fan 716 to effect heat exchange between ambient air (e.g., air from outside of the vehicle) and antifreeze from the second antifreeze tank. This heat exchange warms the air, which is subsequently directed to the passenger cabin to provide heating to the cabin. After flowing through radiator 714, antifreeze returns to the second antifreeze tank at a slightly cooler temperature than the temperature it was at when it left the tank. For example, antifreeze may leave the second antifreeze tank at a temperature of 45±2° C., whereas antifreeze may return to the second antifreeze tank at a temperature of 40±2° C. after exchanging heat with outside air at the radiator.

During a second half-cycle of operation of heat pump 700, first adsorber 702 is in desorbing mode, and second adsorber 704 is in adsorbing mode. As shown, during the second half-cycle, the routing of antifreeze is different relative to the first half-cycle; antifreeze is routed from the second antifreeze tank to the liquid-to-liquid heat exchanger to exchange heat with hot HTF, while antifreeze is routed from the first antifreeze tank to the radiator to exchange heat with outside air and direct the air heated thereby to the passenger cabin to heat the cabin.

FIG. 8 shows an example method 800 for operation of a climate control system (e.g., climate control system 100 shown in FIG. 1) in summer, mild winter, and severe winter modes.

At 802, method 800 includes selecting an operating mode of the climate control system based on ambient conditions, user input, etc. For example, the selection may be based on a currently sensed ambient temperature, or a record of sensed ambient temperature values over a period of time stored in memory of the control system. In this example, if a currently sensed ambient temperature is greater than a first threshold, or if a mean temperature determined based on a record of sensed ambient temperature values is greater than the first threshold, summer mode may be selected. Further, if the currently sensed ambient temperature is less than a second threshold, or if a mean temperature determined based on a record of sensed ambient temperature values is less than the second threshold, mild winter mode may be selected. The second threshold may be less than or equal to the first threshold. Furthermore, if the currently sensed ambient temperature is less than the second threshold, or if a mean temperature determined based on a record of sensed ambient temperature values is less than the second threshold, severe winter mode may be selected. Alternatively, a user may input a selected operating mode prior to or at engine start, for example via electronic fob 122 of FIG. 1. For example, the user may select a desired mode from among summer, mild winter, and severe winter modes, a desired mode from among air-conditioning and heating modes (where air-conditioning mode may correspond to summer mode and heating mode may correspond to mild or severe winter mode based on the currently sensed ambient temperature), or the user may select a desired temperature (which the climate control system may translate into summer, mild winter, or severe winter mode operation depending on its value). In another example, the user may activate the climate control system without indicating a desired mode or temperature, e.g. via an electronic fob, and the control system may determine an appropriate mode of operation based on ambient conditions.

If summer mode is selected, method 800 continues to 804. At 804, method 800 includes cooling an adsorbent of an adsorbing adsorber with HTF from a cold HTF circuit while heating an adsorbent of a desorbing adsorber with HTF from a hot HTF circuit. For example, cooling/heating an adsorbent may include flowing the cold/hot HTF through one or more fin tubes thermally coupled with the adsorbent within an enclosure of the adsorber. Fins of the fin tube(s) may extend into the adsorbent, and may assist with heat transfer between the HTF within the fin tube(s) and the adsorbent.

After 804, method 800 continues to 806. At 806, method 800 includes controlling antifreeze circuit valves to direct antifreeze from a tank coupled with the adsorbing adsorber to an air-to-liquid heat exchanger, while directing cabin air through the air-to-liquid heat exchanger. For example, depending on which adsorber is currently adsorbing, the controller may control valves 418, 420, 422, and 424 as well as pumps 412, 414, 428, and 430 of FIG. 4 to direct antifreeze from the tank of the adsorbing adsorber to and from the air-to-liquid heat exchanger. A blower coupled with the air-to-liquid heat exchanger may be further be controlled to direct cabin air through the air-to-liquid heat exchanger.

At 806, method 800 further includes controlling antifreeze circuit valves to direct antifreeze from a tank coupled with the desorbing adsorber to a radiator, while directing outside air through the radiator. For example, depending on which adsorber is currently desorbing, the controller may control valves 418, 420, 422, and 424 as well as pumps 412, 414, 416, and 426 of FIG. 4 to direct antifreeze from the tank of the desorbing adsorber to and from the radiator. A fan coupled with the radiator may be further be controlled to direct outside air through the radiator.

After 806, method 800 continues to 808 to determine whether a half-cycle of the thermal-adsorption heat pump has been completed. For example, the determination may be made based on whether a predetermined duration has elapsed since the beginning of the cycle. Alternatively, the determination may be made based on sensed values of parameters associated with the heat pump such as a volume of refrigerant adsorbed by the adsorbing adsorber, a volume of refrigerant stored in the wick material of wick chambers coupled with the desorbing adsorber, etc.

If the answer at 808 is NO, method 800 returns to 808 and adsorption and desorption continue at the adsorbers until a positive determination is made at 808. For example, the controller may check whether a half-cycle of the heat pump has been completed intermittently, or an interrupt may be generated when a half-cycle of the heat pump has been completed.

Otherwise, if the answer at 808 is YES, method 800 continues to 810 to switch the modes of the adsorbers. Switching the modes of the adsorbers may involve changing the positions of valves coupling the HTF circuits with the adsorbers, as the current mode (e.g., adsorbing or desorbing) of an adsorber may be based on whether hot or cold HTF is flowing through the fin tube(s) of the adsorber. For example, at 810, the controller may control valves such as valves 330, 332, 334, 340, 344, 346, 348, and 350 of FIG. 3 to decouple the cold HTF circuit from the adsorber which was adsorbing during the first half-cycle, and couple the hot HTF circuit with that adsorber such that it switches to desorbing mode. At the same time, the controller may control the valves to decouple the hot HTF circuit from the adsorber which was desorbing during the first half-cycle, and couple the cold HTF circuit with that adsorber such that it switches to adsorbing mode. Thus, the switching of modes results in the adsorbing adsorber of the first half-cycle becoming the desorbing adsorber of the next half-cycle, and the desorbing adsorber of the first half-cycle becoming the adsorbing adsorber of the next half-cycle.

After 810, method 800 returns to 804. The climate control system may repeat the routine of steps 804 to 810 throughout operation of the climate control system in summer mode while the engine is operating. At engine shutdown, the climate control system may be operated in accordance with the method shown in FIG. 9 and described below.

Returning to 802, if mild winter mode is selected, method 800 continues to 812. At 812, like 804, method 800 includes cooling an adsorbent of an adsorbing adsorber with HTF from a cold HTF circuit while heating an adsorbent of a desorbing adsorber with HTF from a hot HTF circuit.

After 812, method 800 continues to 814. At 814, method 800 includes controlling antifreeze circuit valves to direct antifreeze from a tank coupled with the adsorbing adsorber to an air-to-liquid heat exchanger, while directing outside air through the air-to-liquid heat exchanger. For example, depending on which adsorber is currently adsorbing, the controller may control valves 418, 420, 422, and 424 as well as pumps 412, 414, 428, and 430 of FIG. 4 to direct antifreeze from the tank of the adsorbing adsorber to and from the air-to-liquid heat exchanger. A blower coupled with the air-to-liquid heat exchanger may further be controlled to direct outside air through the air-to-liquid heat exchanger.

At 814, method 800 further includes controlling antifreeze circuit valves to direct antifreeze from a tank coupled with the desorbing adsorber to a radiator, while heating outside air with the radiator and directing the heated air to the passenger cabin. For example, depending on which adsorber is currently desorbing, the controller may control valves 418, 420, 422, and 424 as well as pumps 412, 414, 416, and 426 of FIG. 4 to direct antifreeze from the tank of the desorbing adsorber to and from the radiator. A fan coupled with the radiator may be further be controlled to direct outside air to the radiator to be heated by the radiator, and then to direct the heated air to the passenger cabin.

After 814, method 800 continues to 816 to determine whether a half-cycle of the thermal-adsorption heat pump has been completed (e.g., in the same manner discussed above for step 808).

If the answer at 816 is NO, method 800 returns to 816 and adsorption and desorption continue at the adsorbers until a positive determination is made at 816.

Otherwise, if the answer at 816 is YES, method 800 continues to 818 to switch the modes of the adsorbers (e.g., in the same manner discussed above for step 810).

After 818, method 800 returns to 812. The climate control system may repeat the routine of steps 812 to 818 throughout operation of the climate control system in mild winter mode while the engine is operating. At engine shutdown, the climate control system may be operated in accordance with the method shown in FIG. 9 and described below.

Returning to 802, if severe winter mode is selected, method 800 continues to 820. At 820, like 804 and 812, method 800 includes cooling an adsorbent of an adsorbing adsorber with HTF from a cold HTF circuit while heating an adsorbent of a desorbing adsorber with HTF from a hot HTF circuit.

After 820, method 800 continues to 822. At 822, method 800 includes controlling antifreeze circuit valves to direct antifreeze from a tank coupled with the adsorbing adsorber to a liquid-to-liquid heat exchanger to exchange heat with HTF from the hot HTF circuit. For example, depending on which adsorber is currently adsorbing, the controller may control valves 418, 420, 422, and 424 as well as pumps 412, 414, 432, and 434 of FIG. 4 to direct antifreeze from the tank of the adsorbing adsorber to and from the liquid-to-liquid heat exchanger. Meanwhile, the controller may control valve 330 of FIG. 3 to direct HTF from the hot HTF circuit to the liquid-to-liquid heat exchanger, to exchange heat with the antifreeze flowing in the liquid-to-liquid heat exchanger.

At 822, method 800 further includes controlling antifreeze circuit valves to direct antifreeze from a tank coupled with the desorbing adsorber to a radiator, while heating outside air with the radiator and directing the heated air to the passenger cabin (e.g., in the manner described above for step 814).

After 822, method 800 continues to 824 to determine whether a half-cycle of the thermal-adsorption heat pump has been completed (e.g., in the same manner discussed above for steps 808 and 816).

If the answer at 824 is NO, method 800 returns to 824 and adsorption and desorption continue at the adsorbers until a positive determination is made at 824.

Otherwise, if the answer at 824 is YES, method 800 continues to 826 to switch the modes of the adsorbers (e.g., in the same manner discussed above for steps 810 and 818).

After 826, method 800 returns to 820. The climate control system may repeat the routine of steps 820 to 826 throughout operation of the climate control system in severe winter mode while the engine is operating. At engine shutdown, the climate control system may be operated in accordance with the method shown in FIG. 9 and described below.

It will be appreciated that in some examples, the climate control system operating mode may change during engine operation. For example, during a trip where the vehicle ascends a high elevation such that ambient temperatures transition from hotter temperatures at the starting point to colder temperatures at the elevation during the trip, the operating mode of the climate control system may switch from summer mode to mild or severe winter mode during engine operation. For example, step 802 may occur on an interrupt basis when ambient temperature or another parameter value crosses a threshold.

FIG. 9 shows an example method 900 for operation of a climate control system (e.g., climate control system 100 shown in FIG. 1) after engine shutdown and at or prior to a subsequent engine start to provide surge cooling or heating to the passenger cabin.

At 902, method 900 includes determining whether engine shutdown has occurred. The determination may be made based on sensed parameter values, in one example.

If the answer at 902 is NO, method 900 returns to 902. For example, the controller may perform step 902 intermittently or on an interrupt basis throughout operation of the climate control system while the engine is running.

Otherwise, if the answer at 902 is YES, method 900 continues to 904. At 904, method 900 includes determining the mode in which the climate control system was operating prior to the engine shutdown. For example, a most recent operating state of the climate control system may be stored in memory of the control system, and the controller may access this stored information to make the determination. Alternatively, the determination may be made based on sensed parameter values, e.g. ambient temperature.

If it is determined at 904 that the operating mode of the climate control system prior to engine shutdown was summer mode, method 900 continues to 906. At 906, method 900 includes operating both adsorbers in desorbing mode for a duration. For example, the controller may control valves 330, 332, 334, 340, 344, 346, 348, and 350 of FIG. 3 such that the hot HTF circuit is fluidly coupled with both adsorbers and hot HTF may be pumped through both adsorbers. As a result, refrigerant that may have been adsorbed at the adsorbers during operation of the climate control system in summer mode may be desorbed such that the adsorbents of both adsorbers are prepared for operation in adsorbing mode at or prior to the next engine start.

At 906, method 900 further includes decoupling the wick chambers from the adsorber enclosures. For example, as shown in FIGS. 2A and 2B, each adsorber may include an adsorber enclosure containing an adsorbent and one or more fin tubes. A position of a valve such as valve 220 may determine whether wick chambers thermally coupling the adsorber to a corresponding antifreeze tank may fluidly communicate with the adsorber enclosure. Accordingly, decoupling the wick chambers from the adsorber enclosures of a thermal-adsorption heat pump may include closing a valve such as valve 220 at each adsorber of the heat pump such that no fluid communication may occur between the adsorber enclosure and the wick chambers. Decoupling the wick chambers from the adsorber enclosures while the engine is shut down may advantageously prevent refrigerant vapor from re-entering the adsorbers, e.g. while the vehicle is parked.

After 906, method 900 continues to 908. At 908, method 900 includes determining whether the engine has been started or whether a user has activated the climate control system prior to engine start. For example, the controller may determine whether the engine has been started based on sensed parameter values, e.g. ignition state. Alternatively, the controller may determine that a user has activated the climate control system prior to engine start based on whether a sensor such as fob sensor 120 of FIG. 1 has received input from a remote control such as electronic fob 122 of FIG. 1.

If the answer at 908 is NO, method 900 returns to 908. For example, the climate control system may turn off after step 906, and may remain off until detection of engine start or climate control system activation (e.g., remote climate control system activation by a user prior to engine start), at which point the answer at 908 will be YES.

If the answer at 908 is YES, method 900 continues to 910. At 910, method 900 includes recoupling the wick chambers with the adsorber enclosures. The wick chambers may be recoupled with the adsorber enclosures chambers by opening a valve such as valve 220 of FIGS. 2A and 2B, for example, to enable fluid communication between the adsorber enclosure and the wick chambers (thereby enabling adsorption and desorption at the adsorbers).

At 910, method 900 further includes providing surge cooling to the passenger cabin by operating both adsorbers adsorbing mode for a duration (e.g., 2 to 5 minutes) while controlling antifreeze circuit valves to direct antifreeze from both antifreeze tanks to an air-to-liquid heat exchanger, while directing cabin air through the air-to-liquid heat exchanger. Then, after the duration, the climate control system may be operated normally. Normal operation may refer to asynchronous switching of the two adsorbers of the heat pump between adsorbing and desorbing modes. For example, after 910, method 900 may proceed to method 800 at 804.

Returning to 904, if it is determined at that the operating mode of the climate control system prior to engine shutdown was mild or severe winter mode, method 900 continues to 912. At 912, method 900 includes operating both adsorbers in adsorbing mode for a duration. For example, the controller may control valves 330, 332, 334, 340, 344, 346, 348, and 350 of FIG. 3 such that the cold HTF circuit is fluidly coupled with both adsorbers and cold HTF may be pumped through both adsorbers. As a result, refrigerant within the adsorber enclosures may be adsorbed at the adsorbents such that the adsorbents of both adsorbers are prepared for operation in desorbing mode at or prior to the next engine start. At 912, method 900 further includes decoupling the wick chambers from the adsorber enclosures. As described above for step 906, decoupling the wick chambers from the adsorber enclosures while the engine is shut down may advantageously prevent refrigerant vapor from re-entering the adsorbers while the vehicle is parked.

After 912, method 900 continues to 914 to determine whether the engine has been started or whether a user has activated the climate control system prior to engine start (e.g., as described above for step 908).

If the answer at 914 is NO, method 900 returns to 914. For example, the climate control system may turn off after step 912, and may remain off until detection of engine start or climate control system activation (e.g., remote climate control system activation by a user prior to engine start), at which point the answer at 914 will be YES.

If the answer at 914 is YES, method 900 continues to 916. At 916, method 900 includes recoupling the wick chambers with the adsorber enclosures. As described above for step 910, recoupling the wick chambers with the adsorber enclosures enables fluid communication between the adsorber enclosures and the wick chambers (thereby enabling adsorption and desorption at the adsorbers).

At 916, method 900 further includes providing surge heating to the passenger cabin by operating both adsorbers desorbing mode for a duration (e.g., 2 to 5 minutes) while controlling antifreeze circuit valves to direct antifreeze from both antifreeze tanks to a radiator, while heating outside air with the radiator and directing the heated outside air to the passenger cabin. Then, after the duration, the climate control system may be operated normally. Normal operation may refer to asynchronous switching of the two adsorbers of the heat pump between adsorbing and desorbing modes. For example, after 916, method 900 may proceed to method 800 at 812 or 820, depending on whether mild winter mode or severe winter mode is appropriate for ambient conditions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for vehicle cabin climate control system, comprising:
during engine operation, asynchronously switching first and second adsorbers of a thermal-adsorption heat pump communicating with engine exhaust heat between adsorbing and desorbing modes, the adsorbing adsorber cooling antifreeze via wick chambers and the desorbing adsorber heating antifreeze via wick chambers; and
conditioning cabin air via the heated antifreeze or the cooled antifreeze depending on an operating mode of the climate control system.

2. The method of claim 1, wherein an engine is cooled by engine coolant, the engine coolant not circulating through the climate control system.

3. The method of claim 2, wherein the adsorbing adsorber cooling antifreeze via wick chambers comprises evaporation of refrigerant from the wick chambers thermally coupling an antifreeze tank with an enclosure of the adsorbing adsorber, and wherein the desorbing adsorber heating antifreeze via wick chambers comprises condensation of refrigerant at the wick chambers thermally coupling an antifreeze tank with an enclosure of the desorbing adsorber.

4. The method of claim 3, wherein conditioning cabin air during a summer mode comprises exchanging heat between antifreeze from the antifreeze tank of the adsorbing adsorber and cabin air, and wherein conditioning cabin air during a mild or severe winter mode comprises exchanging heat between antifreeze from the antifreeze tank of the desorbing adsorber and outside air and directing the heated outside air to a cabin.

5. The method of claim 4, further comprising:
cooling heat transfer fluid (HTF) via an HTF cooler in a cold HTF circuit;
exchanging heat between engine exhaust and HTF in a hot HTF circuit;
pumping HTF from the cold HTF circuit through one or more fin tubes thermally coupled with an adsorbent in the adsorbing adsorber; and pumping HTF from the hot HTF circuit through one or more fin tubes thermally coupled with an adsorbent in the desorbing adsorber.

6. The method of claim 5, further comprising:
during the summer mode, cooling antifreeze from the antifreeze tank of the desorbing adsorber via heat exchange with outside air;
during the mild winter mode, heating antifreeze from the antifreeze tank of the adsorbing adsorber via heat exchange with outside air; and
during the severe winter mode, heating antifreeze from the antifreeze tank of the adsorbing adsorber via heat exchange with HTF from the hot HTF circuit.

7. The method of claim 6, further comprising:
after engine shutdown during the summer mode, operating both adsorbers in the desorbing mode for a duration via heat exchange between HTF from the hot HTF circuit and the adsorbents of both adsorbers;
after engine shutdown during the mild or severe winter mode, operating both adsorbers in the adsorbing mode for a duration via heat exchange between HTF from the cold HTF circuit and the adsorbents of both adsorbers; and then
decoupling the wick chambers of each adsorber from the corresponding adsorber enclosure.

8. The method of claim 7, further comprising, at or prior to engine start:
coupling the wick chambers of each adsorber with the corresponding adsorber enclosure;
in a surge cooling mode prior to summer mode operation, operating both adsorbers in the adsorbing mode for a duration; and
in a surge heating mode prior to mild or severe winter mode operation, operating both adsorbers in the desorbing mode for a duration.

9. The method of claim 1, further comprising:
during a first condition, conditioning cabin air via the heated antifreeze;
during a second condition, conditioning cabin air via the cooled antifreeze; and
during both conditions, conditioning cabin air without using engine coolant.

10. A vehicle system, comprising:
an internal combustion engine; and
a climate control system, having a thermal-adsorption heat pump driven by engine exhaust heat, the heat pump comprising two adsorbers and two antifreeze tanks, each adsorber thermally coupled with antifreeze in a corresponding antifreeze tank via refrigerant-containing wick chambers, wherein the climate control system does not receive engine coolant.

11. The system of claim 10, further comprising a hot heat transfer fluid (HTF) circuit comprising an exhaust heat collector and a phase change material (PCM) vessel storing exhaust heat, and a cold HTF circuit comprising an HTF cooler.

12. The system of claim 11, wherein each adsorber comprises one or more fin tubes thermally coupled with an adsorbent, and wherein HTF from the hot HTF circuit or the cold HTF circuit flows through the one or more fin tubes of each adsorber depending on an operating mode of the system.

13. The system of claim 10, wherein the climate control system does not include an engine-driven compressor.

14. The system of claim 10, further comprising a controller with instructions stored in memory to asynchronously switch the adsorbers in the climate control system between adsorbing and desorbing modes.

15. A method for operating a vehicle climate control system, comprising:
driving a thermal-adsorption heat pump with engine exhaust heat responsive to engine start and shutdown;
cooling antifreeze via evaporation of refrigerant in wick chambers coupled with a first adsorber of the heat pump while heating antifreeze via condensation of refrigerant in wick chambers coupled with a second adsorber of the heat pump; and
conditioning passenger cabin air with the heated antifreeze during colder weather and the cooled antifreeze during hotter weather.

16. The method of claim 15, further comprising asynchronously cycling the first and second adsorbers between an adsorbing mode and a desorbing mode during operation of the climate control system while an engine is running.

17. The method of claim 16, wherein conditioning passenger cabin air with the heated antifreeze during colder weather comprises exchanging heat between the heated antifreeze and outside air and directing the heated outside air into a cabin, and wherein conditioning passenger cabin air with the cooled antifreeze during hotter weather comprises exchanging heat between the cooled antifreeze and cabin air and directing the cooled cabin air back into the cabin.

18. The method of claim 17, wherein driving the heat pump with engine exhaust heat comprises heating heat transfer fluid (HTF) via heat exchange with engine exhaust in a hot HTF circuit and flowing the heated HTF through one or more fin tubes of the desorbing adsorber, the method further comprising cooling HTF via an HTF cooler in a cold HTF circuit and flowing the cooled HTF through one or more fin tubes of the adsorbing adsorber.

19. The method of claim 18, further comprising storing engine exhaust heat in a phase change material (PCM) vessel arranged in the hot HTF circuit.

20. The method of claim 19, further comprising:
during hotter weather, operating both adsorbers in the desorbing mode for a duration after engine shutdown and operating both adsorbers in the adsorbing mode for a duration prior to or at a next engine start; and
during colder weather, operating both adsorbers in the adsorbing mode for a duration after engine shutdown and operating both adsorbers in the desorbing mode for a duration prior to or at a next engine start.

* * * * *